United States Patent [19]
Mizutani et al.

[11] Patent Number: 5,931,008
[45] Date of Patent: Aug. 3, 1999

[54] PROTECTING DEVICE FOR CAR AIR CONDITIONER

[75] Inventors: Yasukazu Mizutani; Mitsuhiro Urano; Hideki Koseki; Sun Biao, all of Aichi, Japan

[73] Assignee: Ubukata Industries Co., Ltd, Nagoya, Japan

[21] Appl. No.: 09/050,002

[22] Filed: Mar. 30, 1998

[30] Foreign Application Priority Data

| May 19, 1997 | [JP] | Japan | 9-145875 |
| Jun. 30, 1997 | [JP] | Japan | 9-190402 |
| Jan. 8, 1998 | [JP] | Japan | 10-015014 |
| Jan. 27, 1998 | [JP] | Japan | 10-030488 |

[51] Int. Cl.$^6$ .................................................. B60H 1/32
[52] U.S. Cl. ........................ 62/126; 62/133; 192/103 R; 192/56.41
[58] Field of Search ............................. 62/133, 126, 129, 62/323.4, 243; 192/103 R, 56.1, 56.4, 56.41, 56.42, 56.43, 104 R, 150

[56] References Cited

U.S. PATENT DOCUMENTS

| 4,393,966 | 7/1983 | Kono et al. | 192/150 X |
| 4,462,491 | 7/1984 | Kono et al. | 192/103 R |
| 4,703,627 | 11/1987 | Nakajima | 62/126 X |
| 5,507,152 | 4/1996 | Iwata et al. | 62/133 X |
| 5,694,781 | 12/1997 | Peterson | 62/133 |

*Primary Examiner*—Harry B. Tanner
*Attorney, Agent, or Firm*—Foley & Lardner

[57] ABSTRACT

A protecting device for a car air conditioner includes a timer for timing a period of the rise in the level of a rotation signal delivered from a rotation sensor for detecting a rotational speed of a compressor with the signal being distinguished from noise. On the basis of the obtained period, a judgment is made as to whether rotation of the compressor is in an abnormal state. An electromagnetic clutch between the compressor and a car engine is controlled on the basis of the judgment. The protecting device is mounted on a housing of the compressor with the rotation sensor so that wiring is executed only in an engine room. The protecting device includes a state holding device for memorizing the abnormal state of the rotation of the compressor. The air conditioner can restart on condition that a conscious operation is performed to reset the state holding device.

19 Claims, 15 Drawing Sheets

FIG. 4A ROTATION SIGNAL $S_r$

FIG. 4B INPUT SIGNAL TO PROTECTING DEVICE

FIG. 4C COUNT

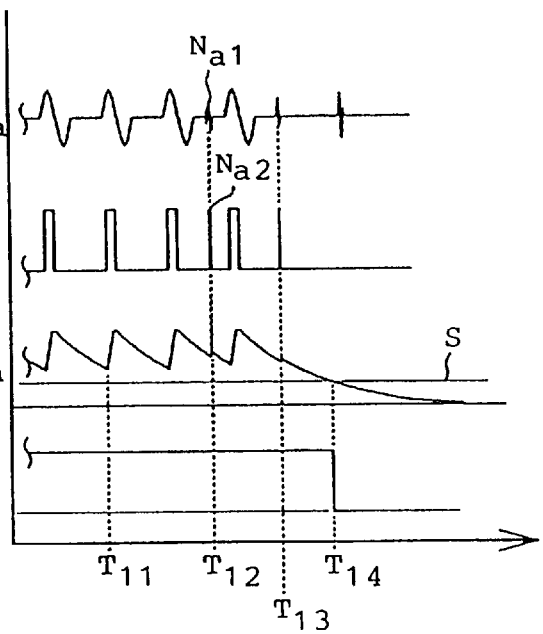
FIG. 9A DETECTION SIGNAL $S_a$
FIG. 9B ROTATION SIGNAL $S_r$
FIG. 9C MAIN TIMER OUTPUT $V_a$
FIG. 9D AMPLIFIER CIRCUIT 34 OUTPUT
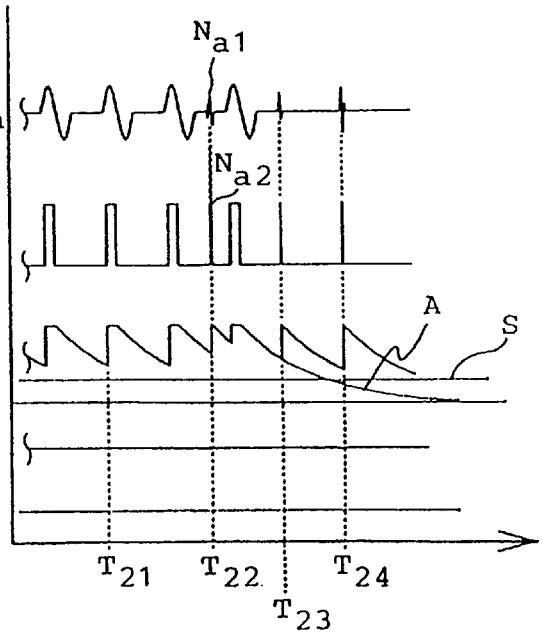
FIG. 10A DETECTION SIGNAL $S_a$
FIG. 10B ROTATION SIGNAL $S_r$
FIG. 10C MAIN TIMER OUTPUT $V_a$
FIG. 10D AMPLIFIER CIRCUIT 34 OUTPUT

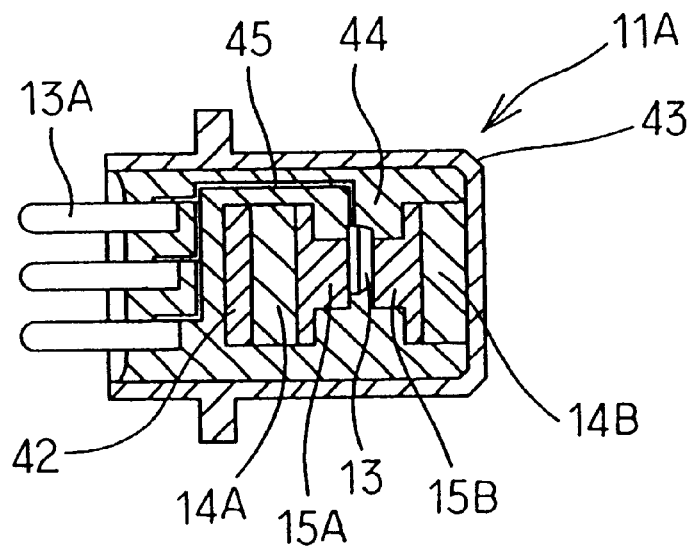
FIG. 14
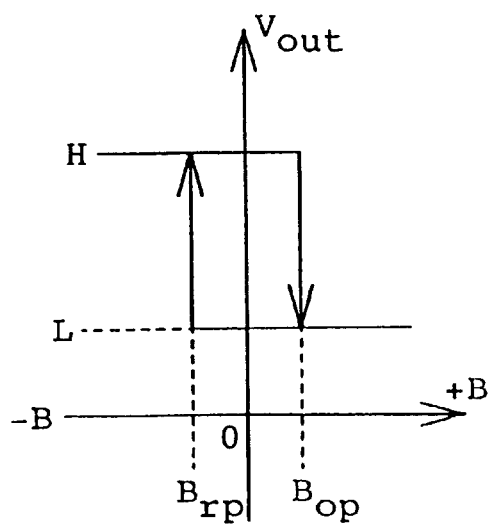
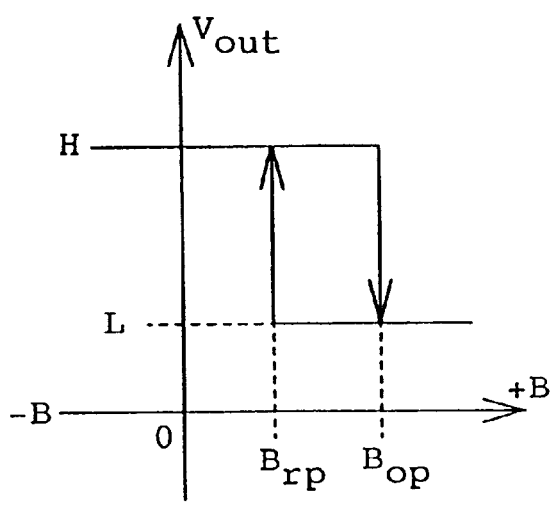
FIG. 15A　　　　　FIG. 15B

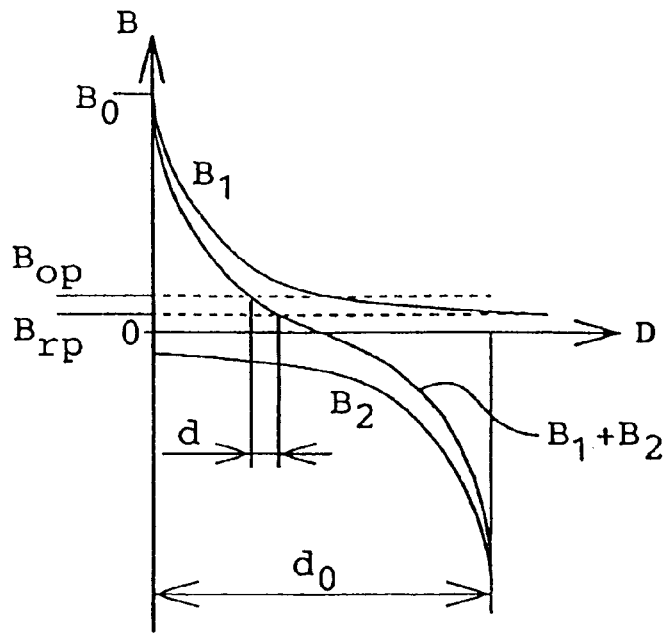
F I G. 1 6
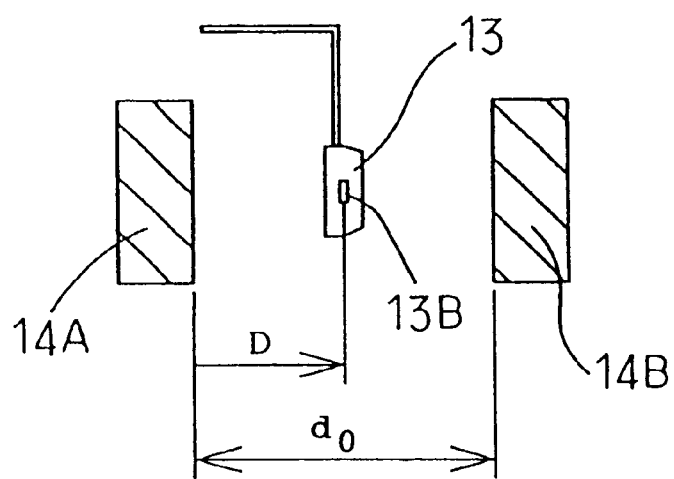
F I G. 1 7

PROTECTING DEVICE FOR CAR AIR CONDITIONER

BACKGROUND OF THE INVENTION

1. Field of the Invention

This invention relates to a protecting device for car air conditioners suitable for protection of compressors of the car air conditioners or more specifically, for control of an electromagnetic clutch transferring rotation of an engine to the compressor.

2. Description of the Prior Art

In car air conditioners, rotation of an engine is usually utilized to rotate a compressor compressing a refrigerant. An electromagnetic clutch is provided on a rotational shaft at the compressor side to drive and stop the compressor. More specifically, a transmission belt is provided between a pulley mounted on a rotational shaft of the engine and another pulley rotatably mounted on the rotational shaft at the compressor side. The electromagnetic clutch is provided between the pulley at the compressor side and a rotor shaft of the compressor. A control signal is delivered to make and cut off a current supply path to the electromagnetic clutch so that the car air conditioner is controlled. The transmission belt is also used to drive pulleys for auxiliary equipment such as an alternator and/or hydraulic booster.

In the above-described car air conditioner, the compressor is continuously engaged via the transmission belt with the engine unless a manually switch is operated to turn off the electromagnetic clutch. Accordingly, when the compressor fails into a non-rotatable state for some reason or other, the transmission belt slips between the pulleys. The slip causes friction and heat which cut off the transmission belt. Consequently, the auxiliary equipments linked to the engine become inoperative. This may result in a hazardous condition in the driving of a car, or the car may be incapable of traveling. In view of the problem, the prior art has recently proposed a protecting device in which the rotation of the compressor is detected to thereby detect the unrotatable state thereof and the slip of the transmission belt so that the current supply path for the electromagnetic clutch is automatically cut off on the basis of the results of detection for escape from danger.

FIG. 18 illustrates such a conventional protecting device for car air conditioner. As shown, an engine room and a compartment are divided by a partition wall 107. A main body of the protecting device 101 is disposed near a console inside the right-hand compartment. At least one end of each of control signal wires 102 and an electric supply wire 103 are connected to the protecting device 101. The other electric supply wire (not shown) is grounded through the metal car body. The other end of each of the signal wires 102 is connected to a rotation sensor 105 mounted on a compressor 104 of the car air conditioner. The electric supply wire 103 is connected to an electromagnetic clutch 106 so that the same is driven. A connector 108 is provided for connecting these wires. The protecting device 101 is connected via a power switch SW for the car air conditioner to a power source.

In the above-described protecting device 101, the electromagnetic clutch 106 is energized through the electric supply wire 103 upon turn-on of the air conditioner power switch SW so that a pulley 109 is directly connected to the compressor 104 by the electromagnetic clutch 106. The protecting device 101 detects a signal delivered from the rotation sensor 105 mounted on the compressor 104 to thereby judge a rotational speed of the compressor. When the compressor 104 is in a non-rotatable state on the basis of the intervals of output signals or when the rotational speed of the compressor is at or below a predetermined value, the electromagnetic clutch 106 is immediately deenergized so that the transmission belt is unburdened for the prevention of fracture thereof and an adverse effect on the auxiliary equipment.

The protecting device 101 is disposed in the car compartment on the right of the partition wall 107, whereas the rotation sensor 105 is mounted on the compressor 104 disposed in the engine room on the left of the partition wall 107, as viewed in FIG. 18. Accordingly, the signal wires 102 and the electric supply wire 103 need to be drawn from the engine room into the car compartment. This results in a complicated wiring work. Furthermore, an external noise tends to be superposed on the signal from the rotation sensor 105 since the signal wire 102 is long. Particularly, the rotation sensor 105 has recently been proposed to be rendered smaller in size and composed of more semiconductor components. These reduces the magnitude of the output signal delivered from the rotation sensor 105. Consequently, there is a higher possibility of malfunction of the protecting device. Additionally, the connector 108 for the three wires and wiring for the long signal wires result in an increase in the costs of the protecting device. A cost decrease is accordingly desired.

SUMMARY OF THE INVENTION

Therefore, an object of the present invention is to provide a protecting device for the car air conditioner wherein a space between the rotation sensor and the device can be reduced, the wiring work between them can readily be carried out, and a degree of superposition of the noise on the signal wires can be reduced such that an erroneous control of the electromagnetic clutch due to the noise can be prevented.

The present invention provides a protecting device for a car air conditioner which receives, from a rotation sensor mounted on a compressor of the car air conditioner, a rotation signal, as an input signal, having a time-dependent component varied according to a rotational speed of the compressor, thereby controlling an electromagnetic clutch provided between the compressor and an engine on the basis of the input signal so that the electromagnetic clutch is energized and deenergized. The protecting device comprises rotational abnormal state judging means repeatedly timing a period of the time-dependent component of the input signal for judging whether rotation of the compressor is under an abnormal state, on the basis of a relation between the timed period and a reference value, noise processing means for substantially continuing a timing operation by the rotational abnormal state judging means without returning the timing operation to an initial state when the time-dependent component of the input signal is at or below a predetermined value, power supply control means for controlling electric power supply to the electromagnetic clutch, abnormal state processing means for cutting off the power supply to the electromagnetic clutch by the power supply control means when the rotational abnormal state judging means judges, during the power supply to the electromagnetic clutch, that the rotation of the compressor is under the abnormal state, and starting processing means for continuing the power supply to the electromagnetic clutch by the power supply control means in preference to an operation of the abnormal state processing means on the basis of a judgment by the rotational abnormal state judging means until the rotation of the compressor is stabilized during starting thereof. In the protecting device, each of the rotational abnormal state judging means, the noise processing means, the power supply control means, the abnormal state processing means, and the starting processing means comprises components each having a heat-resisting temperature higher than a temperature suffered at a mounting location thereof. The protecting device is disposed on or in the vicinity of a surface of the compressor of the car air conditioner.

The protecting device is disposed on or in the vicinity of the surface of the compressor on which the rotation sensor is mounted. Consequently, the wiring works between the protecting device and the rotation sensor and between the protecting device and the electromagnetic clutch can readily be carried out only in the car engine room. Furthermore, since a space between the rotation sensor and the protecting device is shortened, the degree of superposition of the noise can be reduced. Since the noise processing means is provided in addition to the above-described reduction in the degree of superposition of the noise, erroneous control of the electromagnetic clutch due to the noise can be reduced. Consequently, the protecting device can be prevented from detecting the noise without receiving the signal from the rotation sensor to erroneously judge that the compressor is under the normal rotation, and accordingly, the transmission belt can be prevented from being cut off. Additionally, each of the component parts of the protecting device has the required heat-resisting temperature higher. Consequently, the malfunction and failure of the protecting device can be prevented even when the device is mounted on or near the surface of the compressor whose temperature is particularly increased in the engine room.

In a preferred form, the abnormal state judging means monitors a level of the input signal for a predetermined period to detect level variations including a rise and a fall and times a lapse of time between predetermined times of the level variations, thereby obtaining the time-dependent component. Based on a relation between the obtained time-dependent component and a reference value, the rotational abnormal state judging means judges whether rotation of the compressor is under an abnormal state. Furthermore, when the lapse of time is determined to be at or below a value previously determined to correspond to the noise during the timing operation by the rotational abnormal state judging means, the noise processing means continues the timing operation by the rotational abnormal state judging means from a value of the lapse of time before the determination.

In another preferred form, the rotational abnormal state judging means starts the timing operation based on detection of one of the rise and the fall in the level of the input signal. When a lapse of time between the detection of said one of the rise and the fall and detection of the other is determined to be at or below a predetermined value, the input signal is judged to be a noise, and the noise processing means continues the timing operation by the rotational abnormal state judging means from a value of the lapse of time before the determination.

In further another preferred form, the rotational abnormal state judging means comprises a main timer starting in response to the input signal and repeatedly delivering a voltage signal having a magnitude gradually varied from an initial value thereof with lapse of time. The rotational abnormal state judging means compares the gradually varied voltage signal delivered from the main timer with a reference value to thereby judge whether the rotation of the compressor is under the abnormal state. The noise processing means sets a reset time constant of the main timer to an initial value larger than an expected time length of the noise, whereby the timing operation is substantially continued without the main timer being reset to the initial value in response to the input signal having a time length corresponding to the noise. The starting processing means comprises a starting timer starting in connection with starting of the compressor. The starting processing means continues the power supply to the electromagnetic clutch by the power supply control means for a period of time set by the starting timer in preference to the operation of the abnormal state processing means on the basis of the judgment by the rotational abnormal state judging means.

In further another preferred form, the device further comprises a detecting circuit receiving the signal from the rotation sensor. A reverse bias voltage by means of a self induction voltage is applied to the detecting circuit when the electromagnetic clutch is open, so that a detection level of the detecting circuit is corrected.

In further another preferred form, the device further comprises state holding means for memorizing the abnormal state of the rotation of the compressor when the rotational abnormal state judging means judges that the rotation of the compressor is under the abnormal state. The state holding means maintaining deenergization of the electromagnetic clutch until an operation is executed to release the state holding means from a memorized state.

BRIEF DESCRIPTION OF THE DRAWINGS

Other objects, features and advantages of the present invention will become clear upon reviewing the following description of preferred embodiments thereof, made with reference to the accompanying drawings, in which:

FIGS. 9A to 9D are waveform charts for explaining a noise signal processing by the system of FIG. 6;

FIGS. 10A to 10D are waveform charts showing the case where the noise signal processing is not provided in the system of FIG. 6;

FIG. 14 is a sectional view of a rotation sensor comprising a Hall IC and employed in the protecting device of the invention;

FIGS. 15A and 15B show general magnetic response characteristics of a Hall IC of the alternating field type and the Hall IC of the one-sided field type respectively;

FIG. 16 is a graph showing magnetic flux density distribution of biased magnetic field in the rotation sensor;

FIG. 17 shows a manner of setting magnetic bias in the rotation sensor; and

DETAILED DESCRIPTION OF THE PREFERRED EMBODIMENTS

Figure 1:
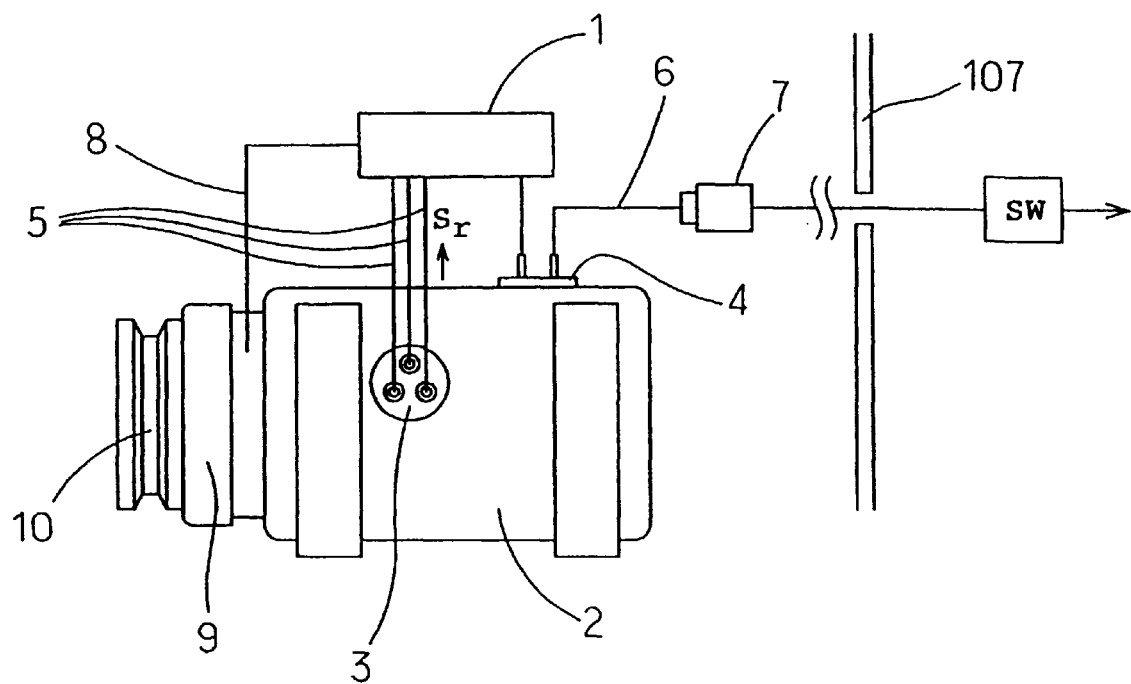
FIG. 1 schematically illustrates a compressor and the protecting device of a first embodiment in accordance with the present invention disposed in the car engine room.

A first embodiment of the present invention will be described with reference to FIGS. 1 to 5. The protecting device 1 of the embodiment is mounted on or in the vicinity of a compressor 2 of a car air conditioner disposed in an engine room of a car. The protecting device 1 includes a control circuit corresponding to signal processing means for receiving and processing a signal from a rotation sensor which will be described later. Each of component parts of the protecting device 1 is selected in view of a temperature in the engine room. More specifically, in order that the protecting device 1 may be disposed in the vicinity of the compressor 2 whose temperature is increased high, each of the component parts has a previously selected heat-resisting temperature higher than a temperature suffered at a mounting location of each component part. A rotation sensor 3 and a temperature switch 4 are mounted on the compressor 2. The rotation sensor 3 is to be connected to the protecting device 1. The rotation sensor 3 is a magnetic sensor comprising a Hall element and is connected to signal wires 5 further connected to the protecting device 1. The temperature switch 4 is connected to an electric supply wire 6 further connected to the protecting device 1. One end of the electric supply wire 6 is connected via a connector 7 and a power supply switch SW for the air conditioner to a power source. The other end of the electric supply wire 6 is connected via the temperature switch 4, an amplifier circuit and/or a relay of the protecting device 1, and a connecting wire 8 to an electromagnetic clutch 9 to be protected by the protecting device 1.

The electromagnetic clutch 9 comprises a driven clutch plate connected to a rotational shaft of the compressor 2 and a driving clutch plate connected to a rotatably mounted pulley 10. Both clutch plates are disengaged from each other during deenergization of the electromagnetic clutch 9 so that the pulley 10 is rotated with the driving clutch plate. Accordingly, the pulley 10 is linked with an engine of the car by a transmission belt (not shown) to be normally rotated while the engine is running though the rotation of the pulley 10 is not transferred to the compressor 2.

Upon turn-on of the air conditioner power switch SW, a starting processing function 21 is first executed in the protecting device 1. Power is supplied via the amplifier circuit and/or the relay serving as power supply control means in the invention to the electromagnetic clutch 9, whereupon the rotation of the pulley 10 is transferred via the electromagnetic clutch 9 to a rotor of the compressor 2 so that the compressor is driven. Thus, the electromagnetic clutch 9 is continuously supplied with power by the starting processing function 21 for a predetermined period of time beginning with the starting of power supply regardless of the status of a rotation signal $S_r$ delivered from the rotation sensor 3.

The rotation sensor 3 delivers an intermittent wave signal as the above-mentioned rotation signal $S_r$ in response to the movement of the rotor when the compressor is in operation. As shown in FIGS. 3B and 4A, a time-dependent component, e.g. a period, of the rotation signal $S_r$ is increased and decreased according to a rotational speed of the compressor rotor. For example, the rotation signals $S_r$ are repeatedly delivered at intervals of at least 100 ms when the compressor is at a minimum rotational speed of 600 rpm under the idle running of the engine.

Figure 2:
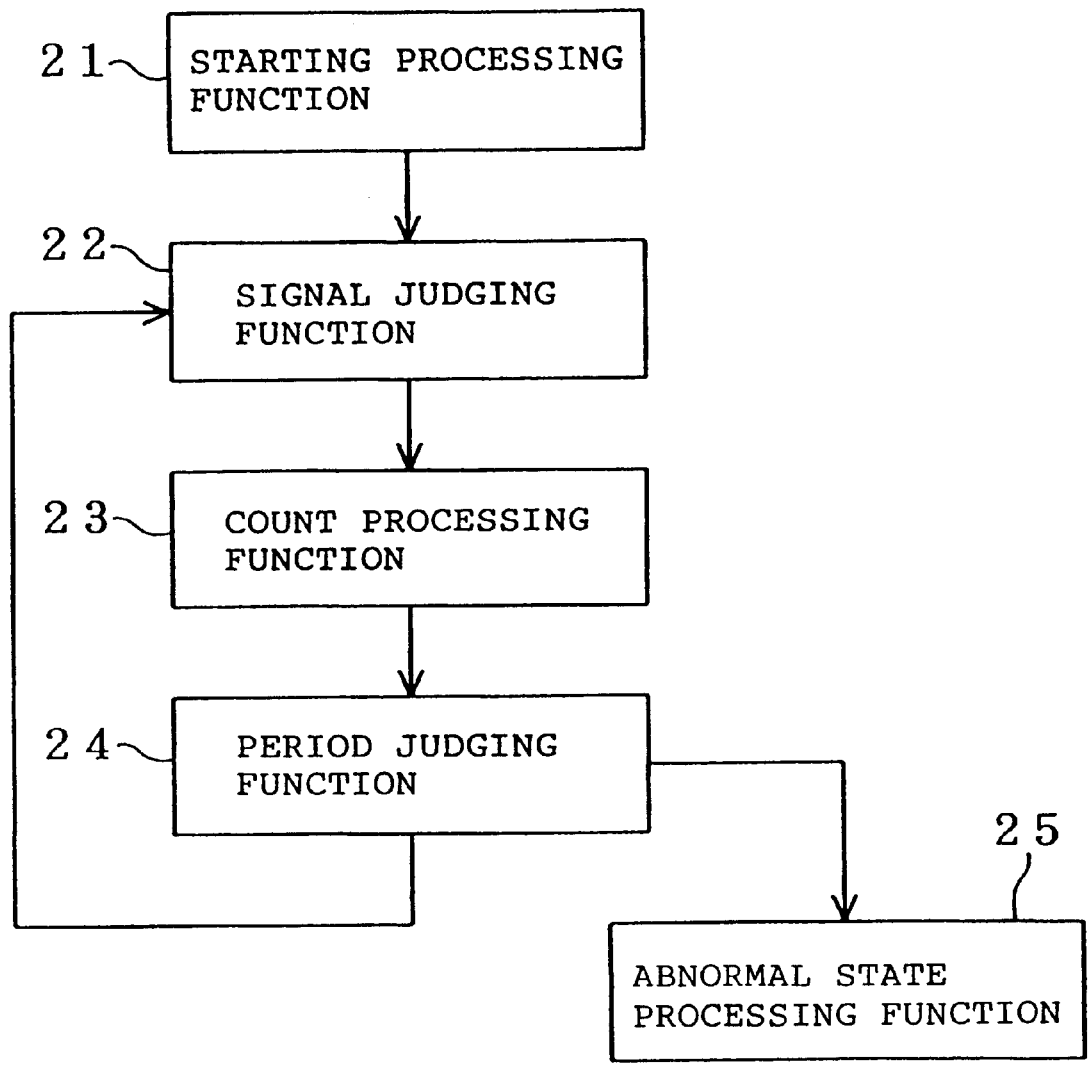
FIG. 2 is a schematic block diagram showing an abnormal state judging system for rotation of the compressor in the protecting device.
Figure 3:
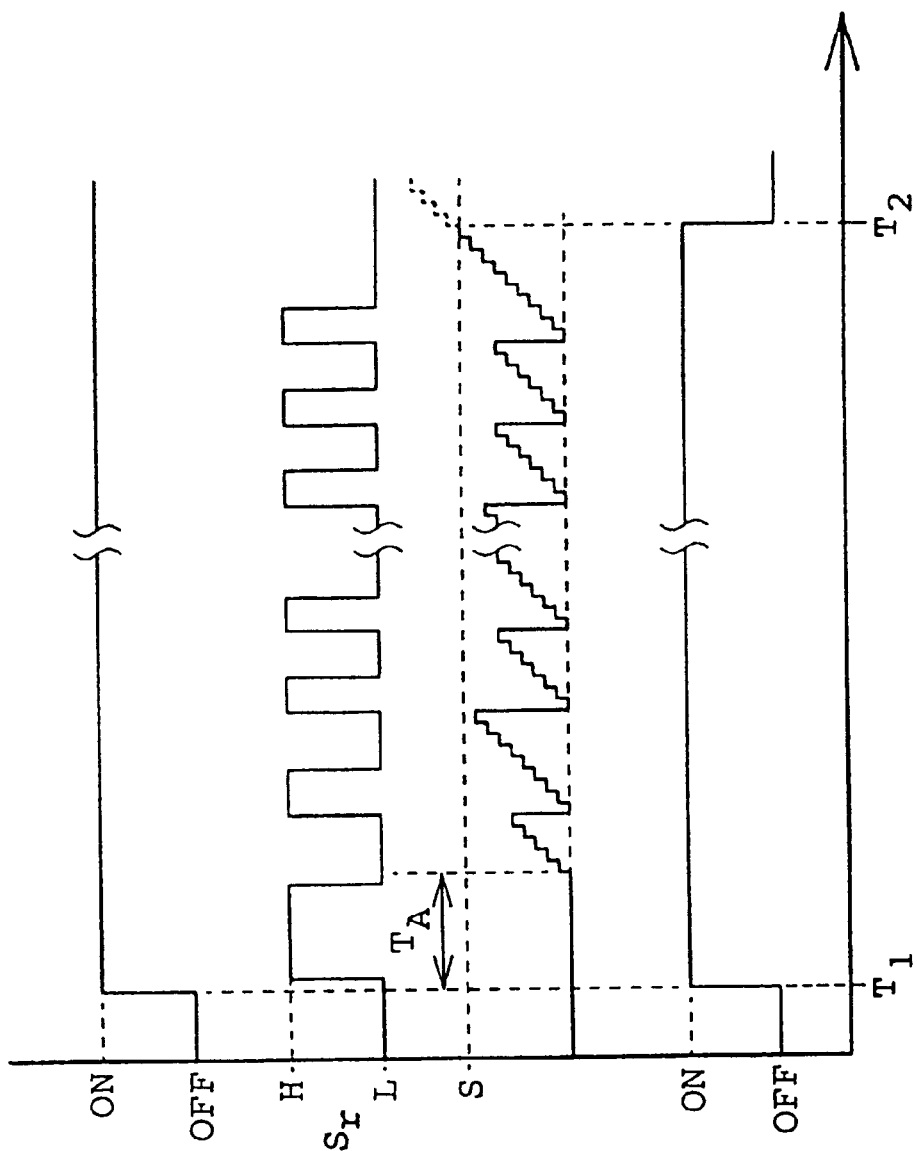
FIGS. 3A to 3D are waveform charts showing signal waveforms and electrical conditions at the respective functions in FIG. 2.
Figure 4:
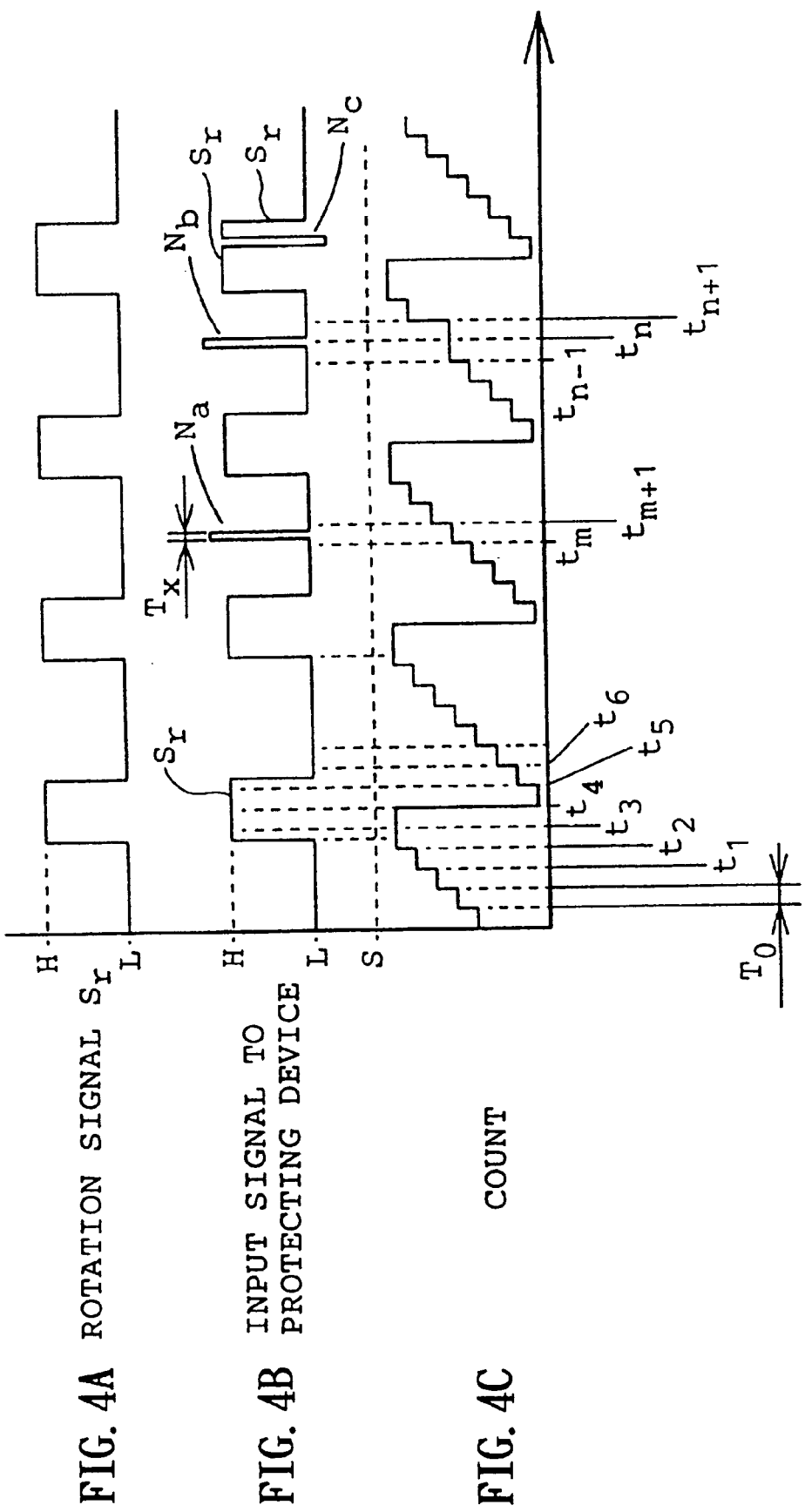
FIGS. 4A to 4C are waveform charts showing the signal waveforms in detail.

The period of the rotation signal $S_r$ is rendered longer than that at the minimum rotational speed of the compressor or is not varied when the rotational speed of the compressor 2 under operation is abnormally decreased or the rotation of the compressor 2 is stopped. Under this condition, the protecting device 1 judges that the compressor has gone wrong despite of running of the engine such that the transmission belt slips, thereby cutting off the power supply to the electromagnetic clutch so that the pulley 10 is disengaged from the compressor 2. Consequently, the transmission belt is prevented from being cut off due to the slip. Thus, when the rotation of the compressor is under the abnormal state during running of the compressor 2, the protecting device 1 serves as rotational abnormal state judging means for the rotation of the compressor 2 as described above, thereby protecting the electromagnetic clutch 9. The rotational abnormal state judging means comprises a signal judging function 22, a count processing function 23 and a period judging function 24 as shown in FIG. 2.

On the other hand, the rotational speed of the compressor 2 is lower than an ordinary working speed at an initial stage of the starting thereof. Accordingly, the rotation signal $S_r$ delivered from the rotation sensor 3 indicates the abnormal state. In view of the foregoing, the rotational abnormal state judging means is not executed at the initial stage of the starting of the compressor 2. The starting processing function 21 as described above is executed instead of the rotational abnormal state judging means. The power supply to the electromagnetic clutch 9 is started as the result of execution of the starting processing function. Thereafter, the power supply is continued for a predetermined period of time until the compressor 2 reaches the ordinary working speed, that is, a required run-up time. The rotational abnormal state judging means is executed upon lapse of the run-up time.

The temperature switch 4 is provided in the midst of the electric supply wire 6 and mounted on the compressor 2. Accordingly, when the compressor 2 is overheated due to, for example, leak of a refrigerant gas of the compressor 2, the power supply to the electromagnetic clutch 9 is stopped by the temperature switch 4. Thus, the power supply to the electromagnetic clutch 9 is stopped before the compressor 2 is rendered non-rotatable due to deformation thereof caused by continuous overheat thereof or for other reasons. Consequently, the compressor 2 and the transmission belt can be prevented from being damaged.

The protecting device 1 is disposed on or in the vicinity of the compressor 2 in the car engine room so that the electromagnetic clutch 9 is energized directly by the protecting device 1. Long signal wires need not be drawn from the engine room to the car compartment as in the prior art.

Furthermore, the employed connector 7 is for the single wire. Consequently, the wiring work can be rendered easier and the cost for the component parts can be reduced. Furthermore, since the signal wires 5 are shortened, the superposition of an external noise on the output signal from the rotation sensor 3 is restricted. If the noise is superposed on the output signal from the rotation sensor 3, the protecting device 1 tends to detect the noise despite of absence of the signal from the rotation sensor 3 thereby to erroneously judge that the compressor 2 is normally being rotated. However, the possibility of the above-described erroneous judgment can be reduced in the foregoing embodiment.

The control manner by the protecting device 1 will be described in detail with reference to FIGS. 2 to 4C. FIG. 2 is a flowchart showing the signal processing by the protecting device 1. FIGS. 3A to 4C are waveform charts showing signal waveforms and electrical conditions at the respective functions in FIG. 2. In FIGS. 3A to 4C, a duty ratio of output of the rotation sensor 3 and a count obtained by a counter function differ from actual ones for the purpose of clarification of the description because the count reaches a large value, for example, 1000 at 600 rpm and 60 at 10000 rpm. However, the basic operation of the protecting device 1 is the same as of the actual device. The control circuit of the protecting device 1 comprises a microcomputer, for example. Since the protecting device 1 is disposed on or in the vicinity of the surface of the compressor in the engine room, the temperature of each of the component parts thereof sometimes exceeds 100° C. In view of the disposition in such a high temperature atmosphere, each of the component parts has a heat resisting temperature of 125° C. These component parts include a CMOS microcontroller PIC12C508-04E manufactured by Microchip Technology Inc., U.S.A. This microcontroller controls power supply control means to supply electric power to the electromagnetic clutch 9 on the basis of the status of the rotation signal delivered from the rotation sensor 3. For this purpose, software is written into the microcontroller by a suitable writing device (not shown) so that a program as will hereinafter be described is accomplished.

The rotation of the car engine is normally transmitted to the compressor 2 so that the compressor is driven at a rotational speed ranging between 600 and 10000 rpm, for example. The rotation signal $S_r$ is an intermittent wave signal and is repeatedly delivered from the rotation sensor 3 for a period ranging between 6 and 100 ms in synchronism with the rotation of the compressor.

The control circuit of the protecting device 1 detects a predetermined change in the output level of the rotation signal $S_r$, that is, either a rise or a fall of the rotation signal $S_r$, thereby measuring the period of the rotation signal to monitor the rotational speed of the compressor 2. More specifically, the control circuit repeatedly monitors the change in the level of the rotation signal $S_r$, for example, the rise thereof or the change from the low level L to the high level H for a monitoring period $T_0$ of, for example, 0.1 ms. The protecting device 1 increments a count by one from an initial value such as 0 every monitoring period $T_0$, thereby obtaining information about the rotational speed of the compressor 2 from the resultant count.

Prior to the above-described monitoring, the starting processing function 21 as shown in FIG. 2 is executed immediately after starting of the car air conditioner at $T_1$ in FIGS. 3A–3D, that is, immediately after the electromagnetic clutch 9 has been engaged. The starting processing function is continued for a required rotation rise-up period of time, that is, until the rotation of the compressor 2 is stabilized $T_A$ in FIGS. 3A–3D, whereby power is supplied to the electromagnetic clutch 9 by the power supply control means for a predetermined period $T_A$, for example, one second irrespective of the presence or absence of the input signal $S_r$ from the rotation sensor 3. Furthermore, the timing operation and the accumulating operation are not executed by the starting processing function 21 for the period $T_A$.

Upon elapse of the period $T_A$, the protecting device 1 starts monitoring the rotational state of the compressor 2. First, the program is transferred to a signal judging function 22 so that the high and low levels H and L of the rotation signal from the rotation sensor 3. The signal judging function 22 compares the detected levels with those of the rotation signal $S_r$ detected last to thereby detect changes in the level of the rotation signal $S_r$, namely, a rise and a fall of the rotation signal. The count processing function 23 and a period judging function 24 monitor a predetermined change in the output level of the rotation signal $S_r$, that is, either the rise or the fall to thereby measure a period of the rotation signal $S_r$ varied according to the rotational speed of the compressor 2.

The above-described operation will be described in detail. The count processing function 23 executes a counting operation every monitoring period $T_0$ depending upon a required time of the program. However, when the signal judging function 22 judges that the rotation signal $S_r$ has changed from the low level L to the high level H, the count processing function 23 interrupts the counting operation in synchronism with the period $T_0$ immediately after the judgment. The interruption is continued until the rotation signal $S_r$ is returned from the high level H to the low level L or the count is reset to an initial state of the timing operation. The count obtained immediately before the interruption is maintained while the interrupted state is retained. The count processing function 23 starts from the maintained count when the rotation signal $S_r$ is returned from the high level H to the low level L. Furthermore, the count processing function 23 is reset on condition that the count is maintained without change twice in synchronism with the period $T_0$, that is, the interrupted state of the counting operation is continued in synchronism with occurrence of the period $T_0$ twice. The count processing function self-resets when the condition is met. The count processing function 23 thus times a time-dependent component of the rotation signal $S_r$, for example, the period of the rise thereof. The signal judging function 22 repeatedly monitors the changes in the high and low levels H and L of the rotation signal $S_r$ for the reference period $T_0$ as shown in FIGS. 4A–4C. The reference period $T_0$ is set to be sufficiently shorter than a normally expected period of the rotation signal $S_r$, for example, at 0.1 ms as described above.

The count processing function 23 increments the count by one on condition that the signal judging function 22 judges that the level of the rotation signal $S_r$ at time $t_2$ is the same as that in the last monitoring executed 0.1 ms before the monitoring at time $t_2$, that is, at time $t_1$, as shown in FIGS. 4B and 4C. At time $t_3$, the signal judging function 22 judges that the rotation signal $S_r$ has changed from the low level L to the high level H in a period between time $t_2$ and time $t_3$. Based on the judgment, the count processing function 23 interrupts the counting operation at time $t_3$, holding the current count. The interruption of the counting operation is continued until the count is reset to its initial value or until the count processing function 23 is reset to its initial state for starting timing while the rotation signal $S_r$ is maintained at the high level H. Since the rotation signal $S_r$ is maintained at the high level H at the subsequent time $t_4$, the interruption of the counting operation is continued. Immediately after time $t_4$, the count processing function 23 judges that the count is maintained at the same value over the two times $t_3$ and $t_4$, thereby resetting the count to the initial value. The count processing function 23 is reset when the rotation signal $S_r$ is maintained at the high level H for a time length exceeding the period $T_0$. This resetting manner signifies that the rotation signal $S_r$ is not a noise but a formal signal delivered based on the rotation detecting operation of the rotation sensor 3.

At time $t_5$ subsequent to completion of the resetting, the above-described operation is repeated in synchronism with the monitoring period $T_0$ until the rotation signal $S_r$ again changes from the low level L to the high level H. The rotation signal $S_r$ changes from the high level H to the low level L at time $t_6$. In the embodiment, however, the count processing function 23 is not reset by the signal judging function 22 on the basis of the fall in the level of the rotation signal $S_r$. Furthermore, the count processing function 23 starts the counting operation when the rotation signal $S_r$ is either at the high level H or the low level L and continues the counting operation unless the rotation signal $S_r$ changes from the low level L to the high level H.

The period of the rise or the fall in the level of the rotation signal $S_r$ is thus employed as the time-dependent component to judge the rotational speed of the compressor 2, as described above. However, the rotational speed may be judged on the basis of a duration of the high or low level H or L of the rotation signal $S_r$, instead. In this case, the count processing function 23 is programmed to be reset on the basis of both rise and fall in the level of the rotation signal $S_r$.

The period of the rotation signal $S_r$ delivered from the rotation sensor 3 varies in a predetermined range when the compressor 2 is driven within a normal range of the rotational speed thereof. The count of the count processing function 23 is initialized before reaching a reference value S serving as a criterion for judging the abnormal state of the rotation of the compressor, namely, a predetermined upper limit. Accordingly, the period judging function 24 judges that the rotation of the compressor 2 is normal. Since an abnormal state processing function 25 is not executed on the basis of the judgment by the period judging function 24, the power supply to the electromagnetic clutch 9 is continued.

The period of the rotation signal $S_r$ is rendered longer than that under the normal condition when an abnormal state of the compressor 2 decreases the rotational speed thereof, for example, when the transmission belt on the pulley 10 slips. The count of the count processing function 23 exceeds the reference value S as at time $T_2$ in FIGS. 3A–3D when an interval between the fall and the rise in the level of the rotation signal $S_r$ or a signal switching interval exceeds a predetermined period, increasing over 100 ms, which value is not reached under the normal condition. For example, the reference value S is a count of 1000 in the embodiment wherein the monitoring period is set at 0.1 ms. When the count of the count processing function 23 exceeds the reference S, the period judging function 24 of the protecting device 1 judges that the rotation of the compressor 2 is under the abnormal state. Based on the judgment, the protecting device 1 executes the abnormal state processing function 25. The abnormal state processing function 25 stops the power supply to the electromagnetic clutch 9 to disengage the pulley from the compressor 2, thereby preventing the engine and auxiliary equipments from being damaged.

The protecting device 1 in accordance with the invention is disposed on or in the vicinity of the surface of the compressor 2, as described above. Consequently, since the signal wires 5 extending from the rotation sensor 3 is shortened, the degree of possibility of superposition of the noise on the signal wires 5 can be reduced. However, there is still a possibility of noise superposition. In view of this, a noise processing function is added to each of the signal judging function 22 and the count processing function 23 in the embodiment. More specifically, the presence or absence of a level change of the rotation signal $S_r$ from the rotation sensor 3 is monitored for a predetermined period so that a signal time length or a duration of the high or low level H or L of each rotation signal $S_r$ is obtained in order that a signal having such a short time that cannot be generated under the condition of a normal rotational speed may be ignored as noise. For example, the level change of the signal from the rotation sensor 3 is monitored every 0.1 ms as described above so that a signal having a period below 0.1 ms can reliably be treated as the noise.

The noise processing function will be described in detail with reference to FIGS. 4A–4C. The input signal supplied into the protecting device 1 is at an apparent high level H when noise is superposed on the signal wire 5 while the rotation signal $S_r$ is maintained at the low level L. Since a duration $T_x$ of the noise is sufficiently shorter than that of the rotation signal $S_r$, the noise can be distinguished from the normal rotation signal $S_r$ by judging the duration of the noise. In the embodiment, for example, the monitoring period $T_0$ of the protecting device 1 is set so as to be approximately equal to or longer than the duration $T_x$ of the noise. That is, the monitoring period $T_0$ is set at 0.1 ms whereas the duration $T_x$ of the noise is at or below 0.1 ms. When a noise $N_a$ having a duration shorter than 0.1 ms occurs in the middle of a period between the monitoring times $t_m$ and $t_{m+1}$, the noise $N_a$ sometimes spans neither of the monitoring times $t_m$ and $t_{m+1}$. In this case, the signal judging function 22 cannot judge the level change of the noise and accordingly, the noise is not recognized as a signal. Accordingly, the operation of the count processing function 23 is not changed and the counting or timing operation is continued.

When a timing of occurrence of a noise $N_b$ in FIGS. 4A–4C agrees with a monitoring timing $t_n$ of the period $T_0$ of the protecting device 1, the signal judging function 22 judges that the signal level has risen at time $t_{n-1}$ immediately before the monitoring timing $t_n$. Consequently, the counting operation of the count processing function 23 is interrupted and the current count is held. After the subsequent period $T_0$, that is, at time $t_{n+1}$ 0.1 ms after the last period $T_0$, the signal processing function 22 compares the signal level with that at time $t_n$. When the signal is not a noise but a normal rotation signal $S_r$, the signal is maintained at the same level at both times $t_n$ and $t_{n+1}$. As a result, the count processing function 23 is reset. However, a signal having a short duration such as noise $N_b$ changes from the high level H to the low level L in the period between times $t_n$ and $t_{n+1}$. More specifically, the signal judging function 22 judges that the signal is at the low level L at time $t_{n+1}$ and the duration of the signal at the high level H does not exceed the period $T_0$. On the basis of the judgment, the counting operation by the count processing function 23 is restarted from the count held by the count processing function without being reset. The count processing function 23 is programmed to increment the count twice at time $t_{n+1}$ in synchronism with the period $T_0$ so that an increment of count interrupted at time $t_n$ is compensated. Accordingly, the judgment of the period of the rotational signal $S_r$ from the rotation sensor 3 is not adversely affected even when the input of noise to the protecting device 1 interrupts the counting operation. The above-described compensation of the count may be eliminated in a case where there is substantially no problem even when the judgment of noise delays the progress of the counting operation, for example, when an increment of the count by one increases the abnormal state judging time only by 0.1 ms.

A noise Nc with a reverse potential with respect to the above-described noises $N_a$ and $N_b$ is sometimes superposed on the rotation signal $S_r$ in the high level period, as shown in FIGS. 4A–4C. In this case, the signal judging function 22 does not respond to the noise Nc since it has a time length shorter than the monitoring period $T_0$. Furthermore, the input to the protecting device 1 apparently assumes the same state as the signal rise when the noise Nc disappears. The input is not recognized as a signal when the apparent rise takes place before the period $T_0$. Moreover, since the time length of the noise Nc is approximately as short as the noise $N_b$, the input to the protecting device 1 is recognized as a noise even when the apparent rise takes place after the period $T_0$.

According to the embodiment, the rotation of the compressor 2 is prevented from being erroneously judged to be in continuation on the basis of the noise, and accordingly, an adverse effect of the noise is substantially eliminated. Consequently, the power supply to the electromagnetic clutch can reliably be cut off in a predetermined period of time upon occurrence of the abnormal rotation of the compressor.

The period $T_0$ for monitoring the signal output is set at 0.1 ms and the reference value S for the count is set at the count of 1000, that is, 0.1 seconds in the foregoing embodiment. However, the monitoring period and the abnormal state judging value S may be set at various values depending upon the programs for the protecting device. Furthermore, the counter is reset when the input signal to the protecting device 1 is at the high level H continuously twice in synchronism with the period $T_0$ upon detection of the rise in the level of the signal. In this case, the duration of the high level H of the signal is determined on the basis of the relationship between the monitoring period $T_0$ and the abnormal state judging value S. For example, the monitoring period $T_0$ may be set to be sufficiently shorter than the duration of the noise when the above-described microcontroller is replaced by one providing a higher speed processing. For example, in a case where the monitoring period $T_0$ is set at 0.01 ms, the counter may be reset when the input signal to the protecting device is maintained at the high level continuously ten times or more in synchronism with the period $T_0$. Consequently, a signal having a period below 0.1 ms can be ignored as noise. In the same device, when a signal having a period below 1.0 ms is to be ignored as noise, the counter is designed to be reset when the input signal is maintained at the high level at 100 times or more in synchronism with the period $T_0$.

Furthermore, the count processing function 23 may decrement the count by one from an initial value of 1000 every monitoring period To instead of incrementing the count as described above. Additionally, an upper limit serving as a first abnormal state judging value and a second abnormal state judging value smaller than the first value may be provided. In this case, for example, the rotation of the compressor is judged to be abnormal when the count reaches the second judging value twice for one second, and the rotation is unconditionally judged to be abnormal when the count reaches the first abnormal state judging value.

Figure 5:
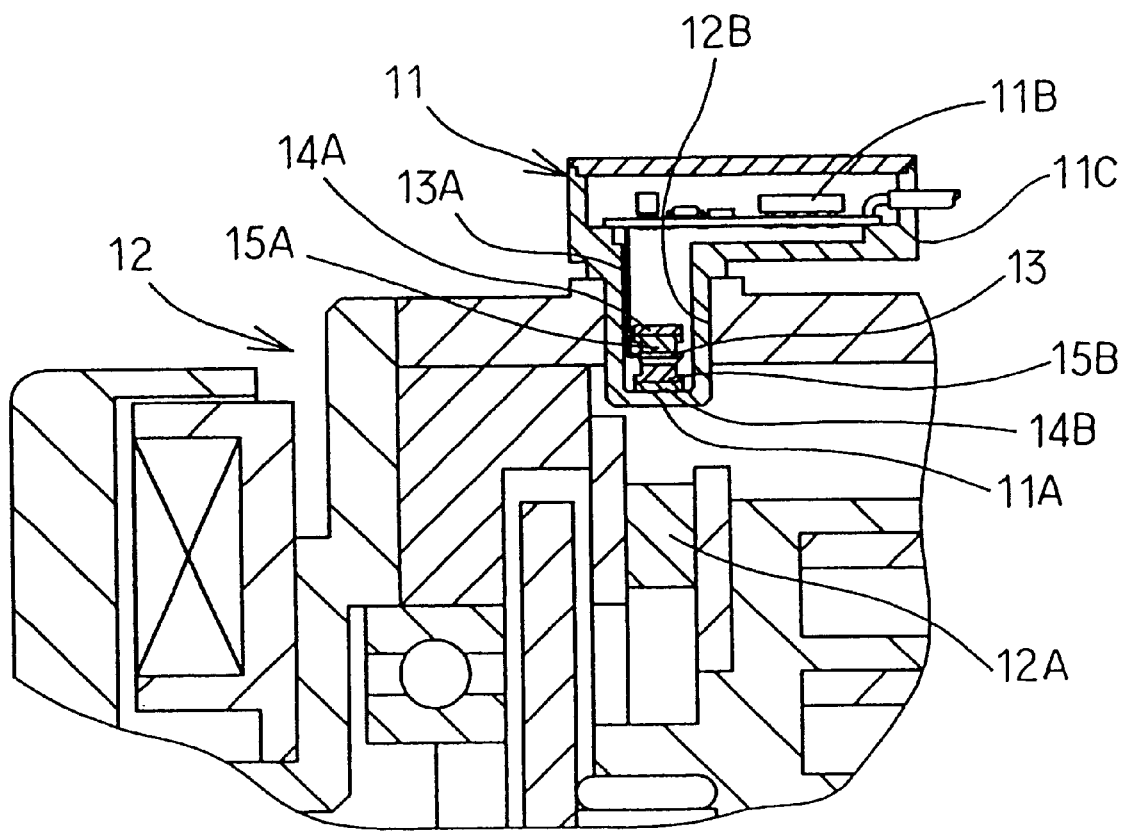
FIG. 5 is a sectional view of an assembly of the rotation sensor and the protecting device mounted on the compressor.
Figure 6:
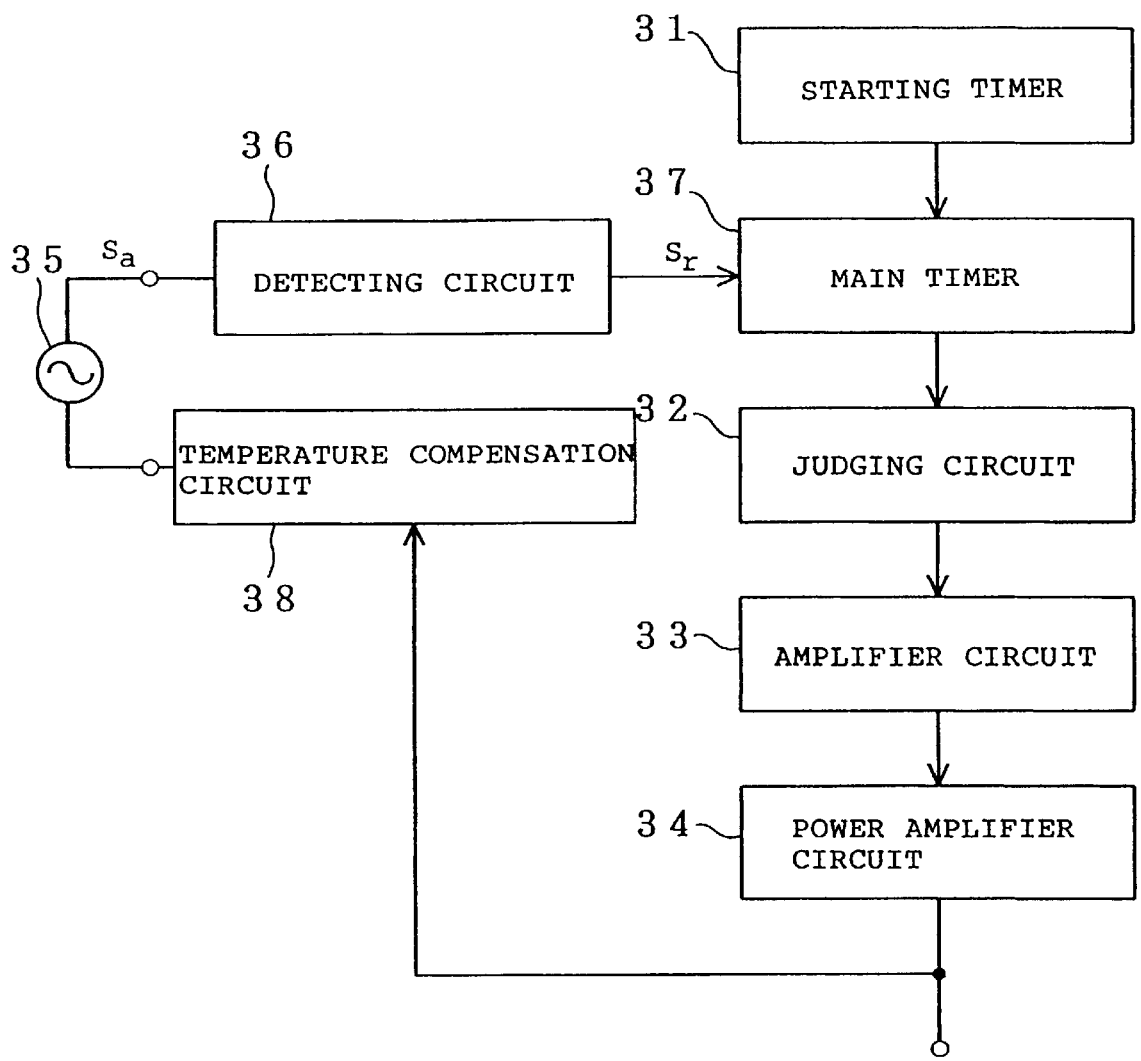
FIG. 6 is a schematic block diagram showing an abnormal state judging system for rotation of the compressor in the protecting device of a second embodiment in accordance with the present invention.
Figure 7:
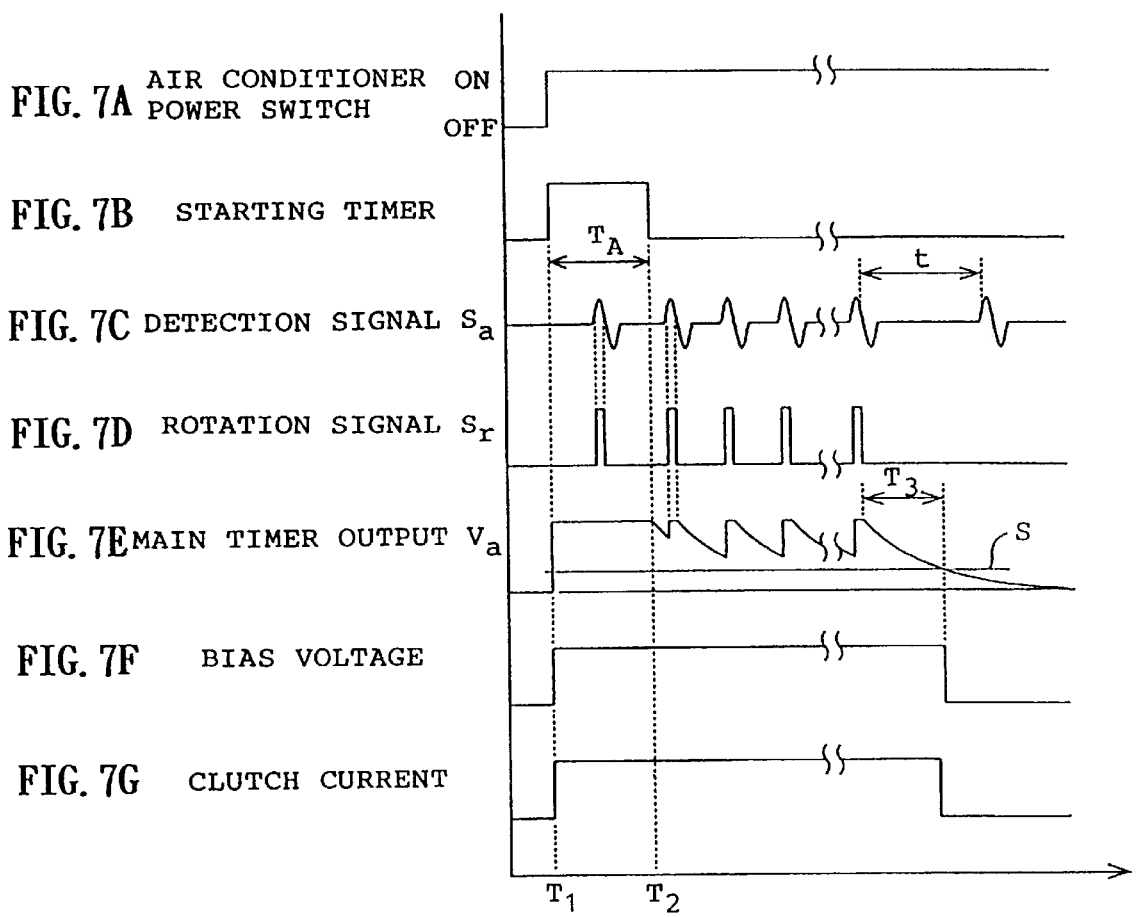
FIGS. 7A to 7G are waveform charts showing signal waveforms at the respective functions in FIG. 6 for explanation of the operation of the system shown in FIG. 6.

In the foregoing embodiment, the protecting device 1 including the signal processing means is separated from the rotation sensor 3 and is disposed on or in the vicinity of the surface of the compressor 2, as shown in FIG. 1. FIG. 5 illustrates a second embodiment in which the protecting device and the rotation sensor are combined together into a single assembly, whereby a small-sized easily disposed protecting device can be provided. A protecting device assembly 11 is mounted on a scroll type compressor 12 in the second embodiment.

The protecting device 11 comprises a casing 11C into which a rotation sensor 11A and the protecting device 11B similar to that shown in FIG. 1 are integrally assembled. The casing 11C includes a downwardly projecting hollow portion in which the rotation sensor 11A is disposed, as viewed in FIG. 5. The protecting device 11B including the signal processing means is disposed in an upper interior of the casing 11C, as viewed in FIG. 5. The rotation sensor 11A comprises a Hall IC 13, two magnets 14A and 14B for generation of a magnetic field and two iron cores 15A and 15B for adjustment of magnetic flux density, for example. The Hall IC 13 is held between the magnets 14A, 14B and the iron cores 15A, 15B, as will be described in detail later. The projecting portion of the casing 11C in which the rotation sensor 11A is disposed is inserted into a through hole 12B formed in a housing of the compressor 12 to be fixed therein, whereupon the protecting device assembly 11 is integrated with the compressor 12. The Hall IC of the rotation sensor has lead terminals 13A connected to the protecting device 11B, instead of the signal wires 5 in the foregoing embodiment. Short junction lead wires may be used for the connection between the Hall IC 13 and the protecting device 11B. A distal end of the rotation sensor 11A is opposed to a movement path for an Oldham's ring 12A of the compressor 12 formed of a magnetic material such as iron. With rotation of the compressor 12, the Oldham's ring 12A is moved repeatedly alternately to come close to and go away from the rotation sensor 11A to vary a density of magnetic flux passing through the Hall IC 13, thereby varying output of the rotation sensor 11A.

The protecting operation by the protecting device assembly 11 is performed in the same manner as in the foregoing embodiment. Since the protecting device 11B is integrally assembled into the compressor 12 together with the rotation sensor 11A, heat generated by the compressor 12 is directly transferred to the protecting device assembly 11. As a result, a temperature of the protecting device 11B is increased depending upon a location thereof. In the second embodiment, however, each of the component parts has a previously selected heat-resisting temperature higher than a temperature suffered at a mounting location of each component part. Thus, the above-described problem can be solved.

According to the protecting device assembly 11, the rotation sensor 11A and the protecting device 11B are integrated such that a distance between the Hall IC 13 constituting a body of the rotation sensor and the protecting device 11B is shortened. Consequently, the superposition of noise can be reduced. Furthermore, since the lead terminals 13A are used to connect the Hall IC 13 to the protecting device 11B, the signal wires connecting between them can substantially be eliminated. This results in easy handling of the protecting device assembly 11. Additionally, since the protecting device 11B is integrally mounted on the compressor 12 together with the rotation sensor 11A, the compressor can readily be handled after the mounting of the protecting device assembly 11. For example, when the compressor is actually operated for inspection before shipment, the compressor need not be connected to a control circuit which is conventionally discrete therefrom. Consequently, wiring between the protecting device 11B and inspection equipment can be simplified.

A third embodiment will be described with reference to FIGS. 6 to 10D. The rotation sensor used in the second embodiment may be the one shown in FIG. 5, an ordinary Hall IC or of the electromagnetic induction coil type. The starting timer 31 starts when the car air condition power switch is turned on (at time $T_1$ in FIGS. 7A to 7G.) The starting timer 31 delivers a time signal having a predetermined period $T_A$, for example, one second. The judging circuit 32, an amplifier circuit 33 and a power amplifier circuit 34, the latter two of which serve as power supply control means, are driven for the one second so that the electromagnetic clutch 9 is energized. As a result, the electromagnetic clutch 9 is reliably energized in the build-up of the car air conditioner until the detection output of the rotation sensor 35 meets predetermined conditions. Furthermore, the detection signal $S_a$ delivered from the rotation sensor 35 is supplied into a detecting circuit 36 simultaneously with engagement of the clutch. Furthermore, a bias voltage of about 0.5 V is also applied to the detecting circuit 36 simultaneously with clutch engagement. Consequently, the level of the signal $S_a$ is increased to a response level of the detecting circuit even in a case where the rotational speed of the compressor is low in a normal range as in the idling of the car engine such that the level of the detection signal $S_a$ delivered from the rotation sensor 35 is low. The detection signal $S_a$ is reliably amplified and its waveform is shaped by the detecting circuit 36, being supplied as the rotation signal $S_r$ to the main timer 37 for drive thereof.

Figure 8:
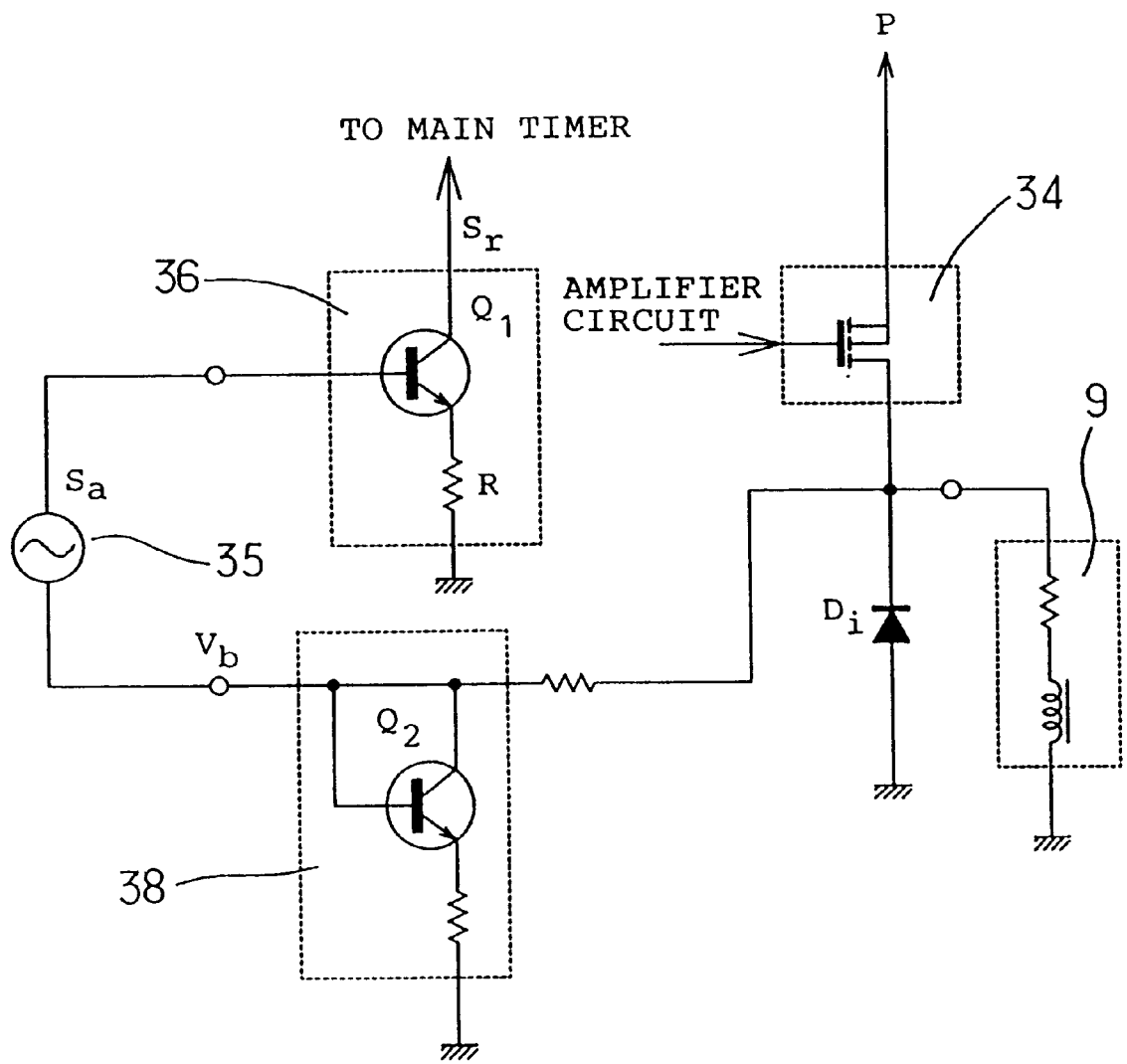
FIG. 8 is a schematic circuit diagram showing the system of FIG. 6.

A temperature compensation circuit 38 is provided between the rotation sensor 35 and a power source P. The temperature compensation circuit 38 comprises a transistor Q2 having the same temperature characteristic as a transistor Q1 used in the detecting circuit 36, as shown in FIG. 8. As the result of provision of the transistors Q1 and Q2, a shift of an operating point of the transistor Q1 due to variations in the ambient temperature is prevented by changing the bias voltage to the transistor Q1 according to variations in the emitter current of the transistor Q2 depending upon the ambient temperature. Consequently, the detecting sensitivity of the detecting circuit 36 to the detection signal $S_r$ can substantially be maintained at a constant value, whereupon a proper operating point can be maintained in a broad temperature range. The transistors Q1 and Q2 preferably have the same production number in the same lot. The main timer 37 is composed into a normal CR timer comprising a resistance and a capacitor. When the rotation signal $S_r$ is supplied to the main timer 37, the CR circuit is instantaneously charged in response to the rise in the level of the input signal, for example, so that the main timer 37 is reset to its initial value, as understood from FIGS. 7A–7G. The initial value of a voltage signal $V_a$ as output of the main timer 37 is at the high level H, for example. The voltage signal $V_a$ is maintained at the high level H until the level of the rotation signal $S_r$ falls from the high level H to the low level L.

For the above-described reason, the output of the main timer 37 is maintained at the high level H for the time length $T_A$ of output of the starting timer 31, as shown in FIGS. 7A–7G. The main timer 37 is reset to the initial value in response to the rise in the level of the rotation signal $S_r$. Thereafter, in response to a subsequent fall in the level of the rotation signal $S_r$, the main timer 37 starts a timing operation in which the value of the voltage signal $V_a$ is gradually decreased from its initial value with lapse of time according to a discharge time constant of the CR circuit. As shown in FIGS. 7A–7G, the above-described timing operation beginning with the reset to the initial value is repeated every time the rotation signal $S_r$ is supplied to the main timer 37. The voltage signal $V_a$ delivered from the main timer 37 as the time signal is supplied to a judging circuit 32. The judging circuit 32 compares the voltage signal $V_a$ with a judgment value S previously determined to correspond to a period of the rotation signal $S_r$ in the abnormal state of rotation of the compressor 2. In a case where the compressor 2 is under the normal condition, the magnitude and the signal interval of the rotation signal $S_r$ are in the respective normal ranges when the output of the starting timer 31 stops (at time $T_2$ in FIGS. 7A–7G). Accordingly, the output voltage signal $V_a$ of the main timer 37 is increased and decreased, maintained at the value at or above the judgment value S of the judging circuit 32. For this while, the power is continuously supplied via the amplifier circuit 33 and the power amplifier circuit 34 to the electromagnetic clutch 9.

The interval t of the detection signal $S_a$ from the rotation sensor 35 exceeds a predetermined time $T_3$, for example, 100 ms upon occurrence of an abnormal state in the compressor 12. Then, the value of the gradually decreased voltage signal $V_a$ from the main timer 37 reduces below the reference value S set in the judging circuit 32, whereupon the output of the judging circuit is cut off. Thus, the cut-off of output of the judging circuit 32 indicates output of a judgment that the rotation of the compressor is under the abnormal state. As the result of the output cut-off, the power supply to the electromagnetic clutch 9 via the amplifier circuits 33 and 34 is cut off. Self-induction of an electromagnetic coil of the clutch 9 transiently flows to maintain the engagement of the clutch immediately after the power cut-off. Accordingly, the signal $S_a$ is sometimes delivered from the rotation sensor 35 due to, for example, slip of the transmission belt even after the cut-off of power to the electromagnetic clutch 9. The above-described bias voltage supplied to the detecting circuit 36 is also cut off when the power to the electromagnetic clutch 9 has been cut off. The rotation signal $S_r$ from the detecting circuit 36 exceeds the reference value S when the magnitude of the output signal $S_a$ of the rotation sensor 35. Accordingly, there is a possibility that the judging circuit 32 may operate to re-engage the electromagnetic clutch 9. The electromagnetic clutch 9 thus presents a hunching in which the clutch is intermittently engaged. Consequently, the transmission belt cannot be protected.

In view of the above-described problem, a reverse bias voltage is applied via the rotation sensor 35 to the detecting circuit 36 by a counter electromotive force generated in the clutch coil while the magnetic clutch 9 is in the engaged state due to the self-induction. The value of the reverse bias voltage is about −0.5 to −1 V at both ends of a diode Di. As the result of the reverse bias applied to the detecting circuit 36, the detection signal $S_a$ delivered from the rotation sensor 35 after the power cut-off to the electromagnetic clutch 9 does not reach the response value. Consequently, the electromagnetic clutch 9 can be prevented from being re-engaged after the power cut-off thereto. Furthermore, although a time period of occurrence of the reverse bias voltage due to the self-induction is short, the clutch 9 is disengaged in this while such that the rotational speed of the compressor 2 is rapidly reduced. Accordingly, the value of output $S_a$ of the rotation sensor 35 is reduced to or below the response value or the compressor is stopped until the reverse bias voltage extinguishes. Thus, the occurrence of hunching can be prevented.

The superposition of noise can be reduced since the signal wires extending from the rotation sensor is shortened in the protecting device of the embodiment. However, there is still a possibility of noise superposition. Assume now, for example, a circuit arrangement in which the main timer 37 instantaneously builds up to the initial value (at $T_{21}$) in response to the rise in the level of the rotation signal $S_r$ which has been rectified and whose waveform has been shaped by the detecting circuit 36, as shown in FIGS. 10A–10D. In the assumed circuit, the output of the main timer 37 also builds up to the initial value in response to the noise rectified, whereupon the timing operation starts. The main timer 37 is reset to the initial value by output $N_{a2}$ delivered from the detecting circuit on the basis of the signal having such a short period as shown by T22, T23 and T24 in FIGS. 10A–10D. In this case, the output voltage signal $V_a$ of the main timer 37 is maintained at or above the judgment value although the signal should normally be decreased to or below the value S. Consequently, the current supply path for the electromagnetic clutch 9 is not cut off in a suitable timing.

In the embodiment, however, the resistance R is provided in the detecting circuit 36 so as to also serve as a charging section for the CR circuit of the main timer 37. A resistance value of the resistance R is set so that a charging time constant of the timer 37 takes a relatively large value. As a result, the signal $V_a$ is gently reset to the initial value as shown by the waveform thereof in FIG. 9C. In other words, a time constant for the reset to the initial value corresponds to a time length of output $N_{a2}$ of the detecting circuit 36 or above, which output corresponds to noise $N_{a1}$. Accordingly, the main timer 37 starts the timing operation in which the output voltage signal $V_a$ of the main timer starts the gradual decrease before completely building up to the initial value. Thus, the main timer 37 is not supplied with a reset signal having a sufficient time length even when receiving the noise during the timing operation, continuing the timing operation from substantially the same level of the signal $V_a$ as immediately before the superposition of noise. Consequently, the timing operation of the main timer 37 is not substantially adversely affected by the noise having a shorter period as compared with the detection signal $S_a$ of the rotation sensor 35 and accordingly, the power supply to the electromagnetic clutch 9 is reliably stopped within an approximately predetermined time upon stop of the detection signal $S_a$ delivered from the rotation sensor (time $T_{14}$).

The temperature compensation circuit is composed of the transistor having the same temperature characteristic as the one composing the detecting circuit in the third embodiment. However, the transistor of the temperature compensation circuit may be replaced by a diode having a temperature characteristic same as or similar to that of the transistor, instead. Furthermore, although the initial value of the main timer 37 is at the high level H in the third embodiment, the initial value may be at the low level L so that the voltage signal $V_a$ has a gradually increased characteristic, instead. In the third embodiment, the electromagnetic clutch 9 can rapidly be interrupted when the rotation of the compressor is in the abnormal state. Furthermore, since the protecting device is provided with the temperature compensation circuit, the protecting device can be prevented from being adversely affected by the ambient temperature although the detecting circuit includes semiconductor parts. This can provide a constant sensitivity to the output of the rotation sensor. Furthermore, the reverse bias voltage is applied to the rotation sensor side of the detecting circuit by the self-induction current induced in the clutch coil at the time of disengagement of the electromagnetic clutch. Consequently, the hunching of the clutch can reliably be prevented. Additionally, since delay means is provided for delaying the reset of the main timer 37 to the initial value, an erroneous control of the electromagnetic clutch due to the noise can be prevented.

Figure 11:
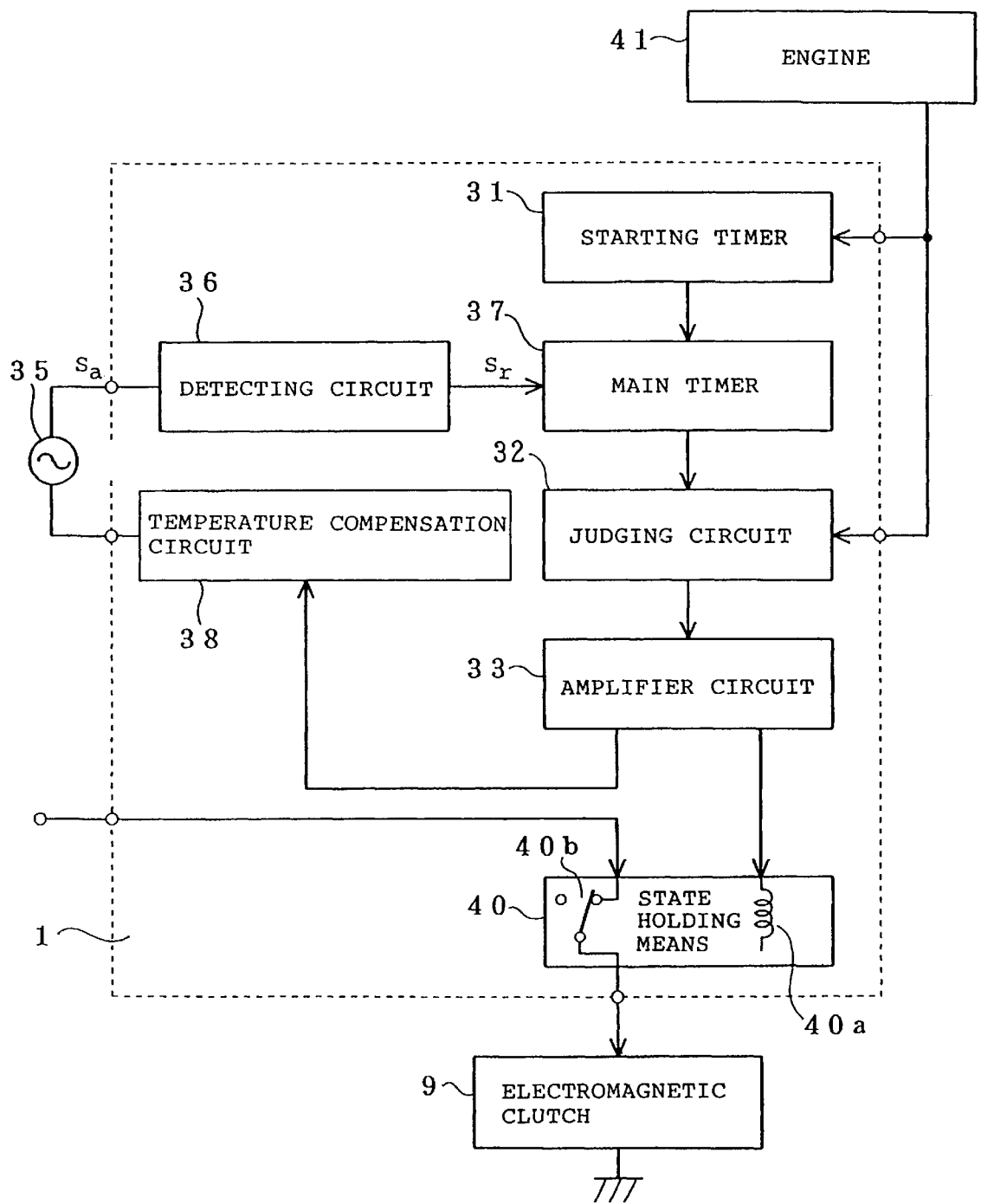
FIG. 11 is a schematic block diagram showing the abnormal state judging system for rotation of the compressor in the protecting device of a third embodiment in accordance with the present invention.
Figure 12:
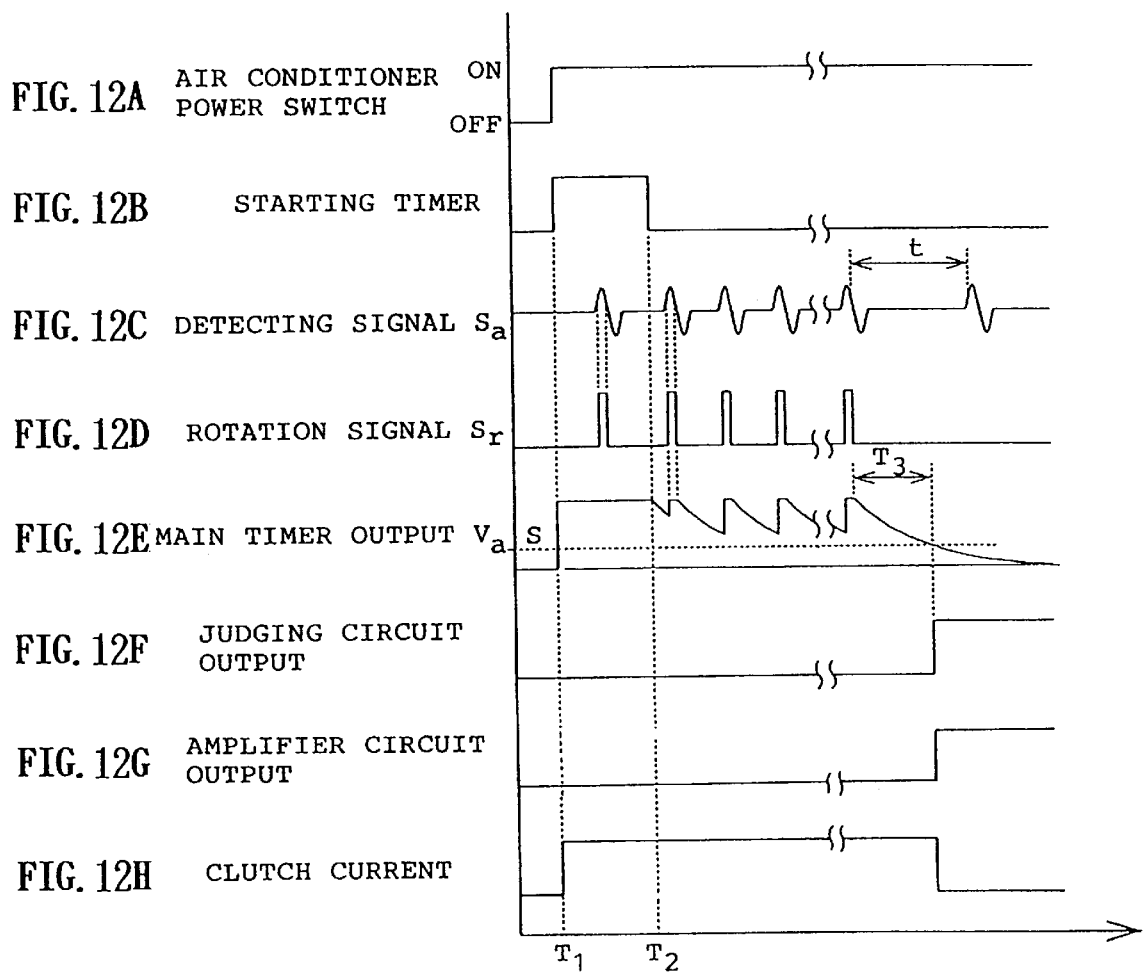
FIGS. 12A to 12H are signal waveform charts for explaining the operation of the system shown in FIG. 11.

FIGS. 11 to 12H illustrate a fourth embodiment. In the fourth embodiment, the protecting device is provided with state holding means for memorizing the abnormal state when the rotation of the compressor has been judged to be in the abnormal state. When the power switch of the air conditioner is turned on again after cut-off of the power supply to the electromagnetic clutch on the basis of the judgment of the abnormal state, the state holding means holding the abnormal state prevents re-start of power supply to the electromagnetic clutch until the state holding means is reset. The state holding means preferably comprises means for mechanically memorizing the abnormal state, e.g., a self-hold type relay such as a latching relay or means for electronically memorizing the abnormal state, e.g., an electronic circuit.

A self-hold type relay or latching relay serving as the state holding means is provided in the protecting device 1 together with other electronic components, as shown in FIG. 11. The latching relay comprises a drive coil serving as a drive section and a switching contact serving as an output section as well known in the art. The power supply to the electromagnetic clutch is normally performed by the switching contact.

When the switching contact of the latching relay is operated in a direction for holding the state, the latching relay is maintained in the holding state until a manually resetting operation is executed or a resetting current is supplied to the drive coil to switch the contact in an opposite direction. Thus, the latching relay is not reset without the specific operation as described above. Upon occurrence of an abnormal state of the rotation of the compressor, the judging circuit judges that the rotation of the compressor is in the abnormal state, based on the signal delivered from the rotation sensor. The drive coil of the latching relay is then energized to open the switching contact. As a result, the power supply to the electromagnetic clutch is cut off. The latching relay is maintained in the memorizing state even when the power supply to the air conditioner or the protecting device is cut off. Accordingly, as contrary to the prior art, the electromagnetic clutch is not engaged even when the power switch of the air conditioner is turned on again. Furthermore, since the latching relay needs no power supply for the state holding, the abnormal state can reliably be held.

The operation of the protecting device of the fourth embodiment will be described. Only the difference between FIG. 6 and FIG. 11 will be described. In the constitution of FIG. 11, the power supply to the electromagnetic clutch 9 is continued by the starting timer 31 during the starting of the air conditioner irrespective of the result of the judgment as to the abnormal state as in the constitution of FIG. 6. Furthermore, the rotation signal $S_r$ from the detecting circuit 36 is usually monitored by the main timer 37 and the judging circuit 32 as in the constitution of FIG. 6.

The interval (t in FIG. 12C) of the output signal $S_a$ from the rotation sensor 35 exceeds a predetermined time ($T_3$ in FIG. 12E), for example, 100 ms upon occurrence of an abnormal state of the compressor 2. Then, the value of the gradually decreased voltage signal $V_a$ from the main timer 37 reduces below the judgment value S set in the judging circuit 32. The judging circuit 32, judging that the abnormal state has occurred, delivers output indicative of the abnormal state. The output of the judging circuit 32 is delivered via the amplifier circuit 33 to the drive section 40a of the state holding means 40 as a drive signal. As a result, the output section 40b of the state holding means 40 is switched to the different state, namely, operated in such a direction that the power supply to the electromagnetic clutch 9 is cut off. For example, the output section 40b is switched to the off-state to thereby stop the power supply to the electromagnetic clutch 9.

In the aforementioned embodiments, the starting timer delivers the signal when the power switch of the air conditioner is turned off and is subsequently turned on. Based on the signal, the judging circuit judges that the rotation of the compressor is assumed to be normal, whereupon the power is re-supplied to the electromagnetic clutch.

On the other hand, the latching relay or the output section 40b of the state holding means 40 is connected to the current feed path of the electromagnetic clutch 9. The output section 40b serves as the power supply control means. The drive section 40a is maintained in the driving state and accordingly, the output section 40b is maintained in the off-state when the drive section 40a of the state holding means 40 is driven by the signal delivered from the judging circuit 32 and then amplified by the amplifier circuit 33. Accordingly, the power cut-off to the electromagnetic clutch 9 is continued irrespective of the signal from the starting timer 31 and the detection signal $S_a$ from the rotation sensor 35 until a predetermined resetting operation is executed. The power supply to the electromagnetic clutch 9 is directly cut off by the output section 40b of the state holding means 40 in the abnormal state of the compressor in the fourth embodiment. However, the signal delivered from the judging circuit 32 to the amplifier circuit 33 may be cut off by the output section 40b of the state holding means 40 in the abnormal state, whereby the power supply to the electromagnetic clutch may be cut off, instead. Alternatively, the output section 40b may continuously supply to the judging circuit 32 the signal which is the same as that delivered in response to the abnormal state.

In the fourth embodiment, the drive signal of a car engine 41 is supplied to the judging circuit 32 so that the judging circuit executes a judging operation according to the voltage signal $V_a$ from the main timer 37 only while the engine is running. Without consideration of an operating state of the engine, there is a possibility that the rotation of the compressor may be judged to be abnormal, although the compressor is necessarily not rotated when the engine is off. This erroneous judgment is made, for example, when the engine is turned on and off alternately with the air conditioner power switch being in the on-state, or when an engine failure has occurred. In view of this problem, the drive signal of the engine is supplied to the judging circuit in the fourth embodiment so that a proper judging according to the operating state of the engine is processed. As a result, the erroneous judgment as described above is not made when the power switch of the air conditioner is turned on before the engine starts. Furthermore, the starting timer 31 is driven upon the starting of the engine, so that the control sequence can be transferred to the control of the electromagnetic clutch of the compressor when the engine has been turned on.

Figure 13:
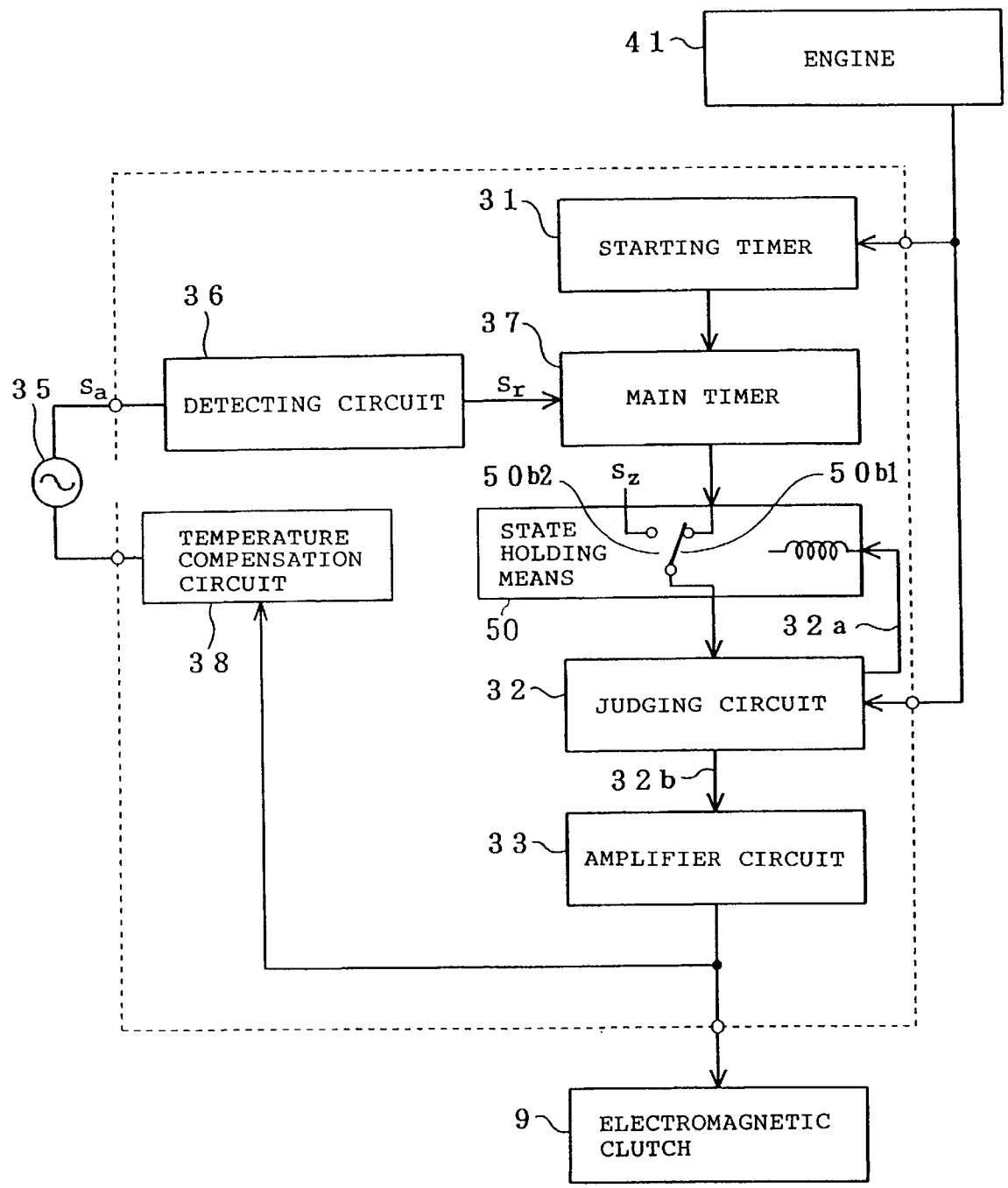
FIG. 13 is a schematic block diagram showing the abnormal state judging system for rotation of the compressor in the protecting device of a fourth embodiment in accordance with the present invention.
Figure 18:
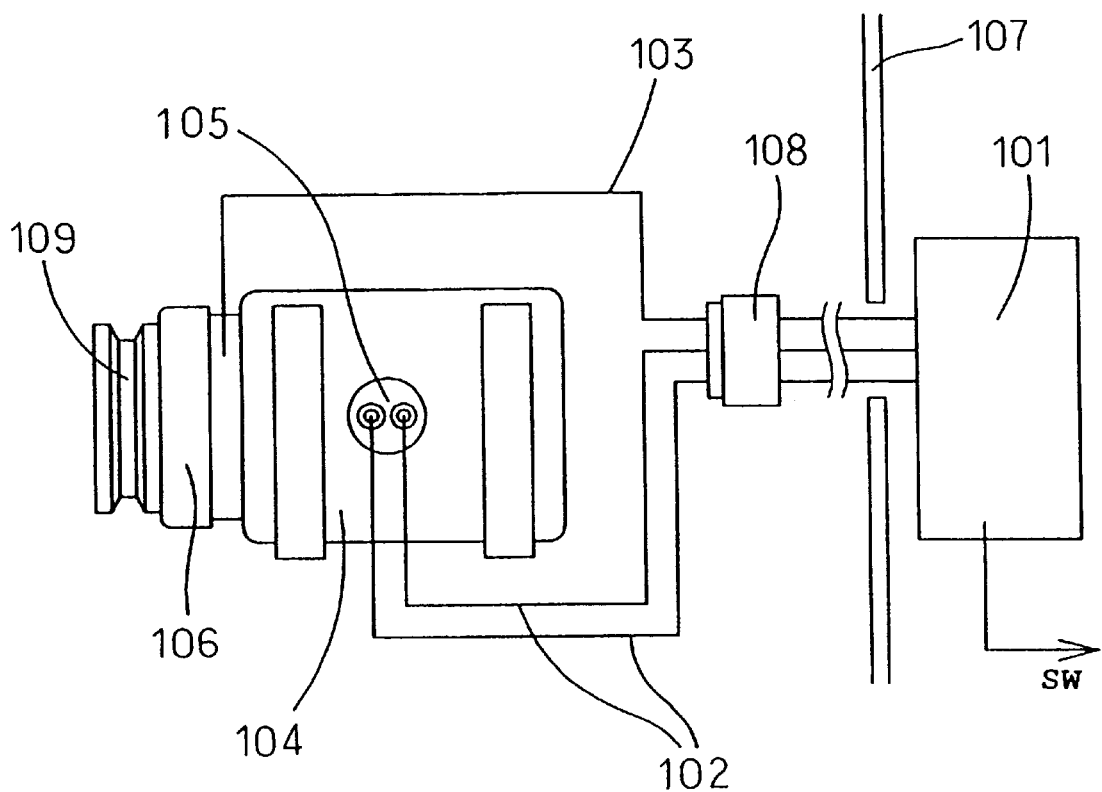
FIG. 18 is a view similar to FIG. 1, showing a conventional air conditioner protecting system.

The above-described constitution may be applied to each of the foregoing embodiments though the description thereof is eliminated. Furthermore, as shown in FIG. 13 as a fifth embodiment, the signal delivery from the starting timer 31 and the main timer 37 to the judging circuit 32 may be cut off by the state holding means 50 and the cut-off of the signal delivery may be continued until the resetting operation is performed. Or the input signal to the judging circuit 32 may be switched to the same state as in the occurrence of the abnormal state and the judging circuit may be maintained in the state until the resetting operation is performed.

The fifth embodiment will be described in detail. In FIG. 13, the identical parts are labeled by the same reference symbols as in FIG. 11 and the description of these parts is eliminated. In the fifth embodiment, the output of the main timer 37 is supplied via the output section 50b1 of the state holding means 50 to the judging circuit 32. When the rotation of the compressor is normal, a judgment signal 32b indicative of the normal state is delivered from the judging circuit 32 to the electromagnetic clutch 9 via the amplifier circuit 33 including a signal amplifying circuit and a power amplifying circuit and serving as the power supply control means, thereby driving the clutch 9. Furthermore, a judgment signal 32a indicative of the abnormal state is delivered from the judging circuit 32 via an amplifier circuit (not shown) to the drive section 50b2 of the state holding means 50. Accordingly, since the state holding means 50 is not driven when the rotation of the compressor is not judged to be in the abnormal state, the voltage signal $V_a$ is supplied from the main timer 37 via the output section 50b1 of the state holding means 50 to the judging circuit 32.

On the other hand, when the rotation of the compressor has been judged to be in the abnormal state, the judging circuit 32 stops delivery of the judgment signal 32b to thereby cut off the power supply to the electromagnetic clutch 9. Simultaneously, the judging circuit 32 delivers the judgment signal 32b indicative of the abnormal state to the drive section 50a of the state holding means 50. The state holding means is then driven to turn off the output section 50b1 and to turn on the drive section 50b2, holding this state. As the result of turn-off of the output section 50b1, the supply of voltage signal $V_a$ from the main timer 37 to the judging circuit 32 is interrupted, and simultaneously, the same input signal $S_z$ (voltage signal at or below the judgment value S) as in the occurrence of the abnormal state is continuously supplied via the output section 50b2 to the judging circuit 32. Consequently, the electromagnetic clutch 9 is not driven since the judging circuit 32 does not respond to the starting timer 31 even when the starting timer 31 is operated during the starting of the engine after the output section 50b2 of the state holding means 50 has been switched.

Thus, judging that the rotation of the compressor is in the abnormal state, the judging circuit 32 switches the state holding means. Thereafter, the power is not supplied to the electromagnetic clutch even by the turn-on of the power switch of the air conditioner unless the state holding means is reset. In addition to the above-described stop of power supply to the clutch, an alarm lamp indicative of the abnormal stop of the compressor may be turned on.

A circuit normally connected to a battery is required as a power supply when the state holding means is composed of electronic circuits such as a flip-flop circuit into the electrically storing means. An electrical battery is preferably provided as the above-mentioned battery other than a car battery. In the case of the electronically storing means, the conditions for the judgment of the abnormal state can more easily be set as compared with the mechanical storing means. More specifically, the state holding means is designed not to be driven until the judgment of the abnormal state is made at a predetermined number of times, for example, at three or five times. The power supply to the electromagnetic clutch is not cut off even when the judgment of the abnormal state is made during the non-drive of the state holding means. When the number of times of the judgment of the abnormal state exceeds the predetermined number of times, the state holding means is driven to cut off the power supply circuit of the electromagnetic clutch. The state holding means holds the cut-off state until reset. The judging circuit may have a function of setting the number of times of the judgment of the abnormal state. In this case, the mechanical state holding means such as the latching relay can be used.

The signal indicative of the judgment of the abnormal state is continuously delivered when the compressor is abruptly falls into a locked state. In this case, only one time of the judgment of the abnormal state is counted. In view of this case, an AND circuit is provided to which the signal indicative of the judgment of the abnormal state and clock pulses are supplied. The AND circuit counts a duration of the locked state of the compressor. Consequently, the state holding means can reliably be driven even when the abnormal state indicative signals each having a short or long period are repeatedly delivered.

The number of times of the judgment of the abnormal state may be processed in relation with an operating time of the car air conditioner. For example, assume now that one time of operation refers to an operation of the air conditioner starting with the starting operation and ending with a subsequent stopping operation. When the number of times of the judgment of the abnormal state for the one time of operation reaches a predetermined number of times, there is a high possibility of failure of the compressor. On the other hand, when the number of times of the judgment of the abnormal state reaches the predetermined number of times in a large number of number of times of the operation for several months, there is a low possibility of failure of the compressor. In view of the foregoing, the monitoring period for which the number of times of the judgment of the abnormal state is monitored by the judging circuit is suitable set so that an accidental abnormal state and malfunction can be processed more properly. For example, the state holding means is reset in link with an turn-on operation of the power switch of the air conditioner. According to this constitution, the compressor and accordingly the air conditioner can re-start by the turn-on operation of the air conditioner power switch in the occurrence of malfunction of the judging circuit due to noise or an accidental restricted state of the compressor due to restorable causes. Furthermore, in the occurrence of an abnormal state wherein the compressor is completely restricted, the compressor stops in a short time even when the air conditioner power switch is turned on. Since this is repeated every time the power switch is turned on, a true abnormal state can reliably found to thereby be reliably coped with.

In view of the use of a latching relay, each of the outputs of the judging circuit and the amplifier circuit is normally at the low level and is changed to the high level upon the judgment of the abnormal state in the fifth embodiment. However, these outputs may normally be at the high level and changed to the low level upon occurrence of the abnormal state depending upon a circuit arrangement of the state holding means or the overall protecting device.

The rotation sensor 11A which is the same as shown in FIG. 5 will now be described with reference to FIGS. 14 to 17. As well known in the art, the Hall IC 13 processes an output signal of the Hall element in an integrated circuit, thereby delivering a binary signal attaining either of two states, namely, a low output state L and a high output state H. FIG. 15A shows a characteristic of the Hall IC. The axis of abscissas represents the density and the directions of a magnetic flux component of the magnetic flux passing through a detecting surface of the Hall element of the Hall IC, which magnetic flux component intersects perpendicular to the detecting surface. This component will be referred to as "transverse magnetic flux component" to the Hall IC. The directions of the magnetic flux component are reversed at both sides of the point where the density of the transverse magnetic flux component becomes zero. The axis of ordinates represents an output voltage of the Hall IC. The Hall IC includes an alternating magnetic field type in which operating points are set symmetrically about the point of zero magnetic flux density as shown in FIG. 15A and a one-sided magnetic field type in which operating points are slightly shifted toward either magnetic pole side as shown in FIG. 15B. Both types of Hall ICs are operated in the same manner.

The Hall IC switches the output voltage $V_{out}$ between a high output state H and a low output state L depending upon the magnitude of a magnetic flux the Hall IC externally receives. The density of the transverse magnetic flux components are varied from the left-hand side to the right-hand side in FIGS. 15A and 15B. The output voltage $V_{out}$ changes from the high output state H to the low output state L when the density of the transverse magnetic flux component exceeds an operating magnetic flux density $B_{op}$. Furthermore, the Hall IC has a hysteresis characteristic that the output voltage changes from the low output state L to the high output state H when the magnetic flux density is decreased to or below a reset magnetic flux density $B_{rp}$.

The rotation sensor 11A comprises the Hall IC 13 composed mainly of a Hall element as a magnetoelectric conversion element and having the above-described hysteresis characteristic, and two magnets 14A and 14B each made from a magnetic material containing rare earth metal. The magnets 14A and 14B are disposed so as to sandwich the magnetic flux detecting surface of the Hall IC therebetween and serves as bias magnetic field generating magnets. The same pole portions, for example, pole S portions of the magnets 14A and 14B face the magnetic flux detecting surfaces at both sides of the Hall IC 13. Distances between the Hall IC 13 and the respective magnets 14A and 14B are defined by iron cores 15A and 15B. The iron cores 15A and 15B are configured and disposed so that the magnetic fluxes of the magnets 14A and 144B are concentrated on the Hall IC.

The following is the reason for the arrangement of the magnets 14A and 14B wherein the same pole portions thereof face the Hall IC 13 and the transverse magnetic flux component is substantially denied therebetween. FIG. 16 shows the magnetic flux density distribution between the magnets 14A and 14B when the magnets are disposed so that the same pole portions are opposed to each other with a distance $d_0$ therebetween as shown in FIG. 17. The axis of abscissas of FIG. 16 represents a vertical distance D relative to a surface of the magnet 14A, and the axis of ordinates represents the magnetic flux density of the vertical component. For example, assume that the magnet 14B were removed. Then, the density of magnetic flux from the magnet 14A is $B_0$ at the location, D=0, which is on the surface thereof, as shown by curve B1. The magnetic flux density of the magnet 14A approximates to zero in infinite distance with the change rate thereof being decreased.

The magnetic flux density of the surface of each of the magnets 14A and 14B is high and about 2000 gauss in the embodiment. On the other hand, a leakage flux density the rotation sensor 11A receives from the electromagnetic coil of the compressor is usually several tens gauss though the value varies depending upon the structure of the compressor or the mounting location of the rotation sensor. The detecting surface 13B of the Hall IC 13 needs to be located at a position where the composition of a unidirectional leakage flux from the electromagnetic clutch and the magnetic flux from the magnets 14A and 14B becomes zero. For this purpose, the distance D between the magnet 14A and the detecting surface 13B needs to be increased by the addition of leakage flux. Accordingly, even when one magnet is used instead of two, the size of the magnetic sensor cannot be reduced though the number of parts is decreased.

In the embodiment shown in FIG. 16, the magnetic field is canceled by a pair of magnets so that a bias magnetic field is applied to the detecting surface of the Hall IC. Accordingly, the transverse magnetic flux density relative to the detecting surface of the Hall IC can be approximated to zero irrespective of the strength of each magnet. Consequently, the magnets can easily be selected and the size of the magnetic sensor can be reduced.

Referring to FIG. 16, the magnet 14B is disposed so that the same pole portions of the magnets 14A and 14B are opposed to each other at the location away from the surface of the magnet 14A by the distance $d_0$. As the result of this disposition, a composite magnetic flux is composed of the axial flux B1 from the magnet 14A which is vertical to the detecting surface 13B of the rotation sensor 11A and the flux B2 from the magnet 14B. The composite magnetic flux is shown by curve B1+B2 in FIG. 16. That is, the composite magnetic flux density is maximum on the surface of the magnet 14A and becomes zero in the middle thereof or assumes a location of equilibrium. The direction of magnetic flux is reversed at the location of equilibrium. The composite magnetic flux density is maximum in the opposite direction on the surface of the magnet 14B. As obvious from FIG. 16, a change rate of the magnetic flux density B to the distance D is larger than that of the magnetic flux density B1 or B2 in the case of a single magnet. Consequently, a large change rate from the operating magnetic flux density $B_{op}$ to the reset magnetic flux density $B_{rp}$ can be obtained in a relatively small section or distance d.

The two magnets are disposed in the rotation sensor 11A in the above-described manner such that the a small-sized high sensitive sensor can be achieved. Furthermore, since the positional relation between the detecting surface 13B of the Hall IC 13 and each of the magnets 14A and 14B can be adjusted so that the density of the magnetic flux component acting on the Hall IC is reduced to or below zero gauss. This allows the use of the Hall IC of the alternating magnetic field type. In the embodiment, the positional relation between the magnets and the Hall IC is changed so that the zero position of the composite magnetic flux density relative to the position of the Hall IC is adjusted, for simplification of the description. However, the shape of each of the iron cores 15A and 15B may be changed so that the zero position of the composite magnetic flux from the magnets 14A and 14B is adjusted, instead.

The leakage flux density the rotation sensor 11A receives from the electromagnetic coil of the compressor is about 60 gauss. The magnetic flux distribution in the rotation sensor 11A is offset in the following manner so that the leakage flux component intersecting perpendicularly to the Hall IC is denied. That is, as shown in FIG. 14, the magnet 14A has an offsetting auxiliary iron core formed on the rear thereof. Accordingly, the magnetic flux moving from the magnet 14A to the Hall IC 13 is stronger than the magnetic flux from the magnet 14B. The balancing location between the magnetic fluxes is offset toward the side of the magnet 14B. An amount of offset is set depending upon the strength and direction of the leakage magnetic flux the rotation sensor 11A mounted on the equipment to be protected. For example, the amount of offset can be varied by changing the shapes of the iron cores 15A and 15B or the strength of the magnets 14A and 14B, instead of the provision of the auxiliary iron core 42. As shown in FIG. 14, these parts are accommodated in the casing 43 made from a non-magnetic material so as to be integrated together and is fixed by a filler 44 such as a synthetic resin. A plurality of lead wires 45 are drawn from the Hall IC 13 for input and output of the control signal and detection signal. Terminals 13A electrically connected to the respective lead wires 45 extend outward.

As described above, the space between the rotation sensor and the protecting device can be reduced, and the wiring work between them can readily be performed only around the compressor. Consequently, the superposition of the noise on the wiring can be reduced, and the malfunction of the electromagnetic clutch due to the noise can be prevented even when the noise is superposed on the wiring. Furthermore, the protecting operation can be stabilized even in the condition of a high ambient temperature.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A protecting device for a car air conditioner which receives, from a rotation sensor mounted on a compressor of the car air conditioner, a rotation signal, as an input signal, having a time-dependent component varied according to a rotational speed of the compressor, thereby controlling an electromagnetic clutch provided between the compressor and an engine on the basis of the input signal so that the electromagnetic clutch is energized and deenergized, the protecting device comprising:

rotational abnormal state judging means repeatedly timing a period of a time-dependent component of a signal supplied to the protecting device for judging whether rotation of the compressor is under an abnormal state, on the basis of a relation between the timed period and a reference value;

noise processing means for substantially continuing a timing operation by the rotational abnormal state judging means without returning the timing operation to an initial state when the time-dependent component of the input signal is at or below a predetermined value;

power supply control means for controlling electric power supply to the electromagnetic clutch;

abnormal state processing means for cutting off the power supply to the electromagnetic clutch by the power supply control means when the rotational abnormal state judging means judges, during the power supply to the electromagnetic clutch, that the rotation of the compressor is under the abnormal state; and starting processing means for continuing the power supply to the electromagnetic clutch by the power supply control means in preference to an operation of the abnormal state processing means on the basis of a judgment by the rotational abnormal state judging means until the rotation of the compressor is stabilized during starting thereof;

wherein each of the rotational abnormal state judging means, the noise processing means, the power supply control means, the abnormal state processing means, and the starting processing means comprises components each having a heat-resisting temperature higher than a temperature suffered at a mounting location thereof; and wherein the protecting device is disposed on or in the vicinity of a surface of the compressor of the car air conditioner.

2. A protecting device according to claim 1, wherein the abnormal state detecting means monitors a level of the input signal for a predetermined period to detect level variations including a rise and a fall and timing a lapse of time between predetermined times of the level variations, thereby obtaining the time-dependent component, and wherein when the lapse of time is determined to be at or below a value previously determined to correspond to the noise during the timing operation by the rotational abnormal state judging means, the noise processing means continues the timing operation by the rotational abnormal state judging means from a value of the lapse of time before the judgment.

3. A protecting device according to claim 2, wherein the rotational abnormal state judging means starts the timing operation based on detection of one of the rise and the fall in the level of the input signal and wherein when a lapse of time between the detection of said one of the rise and the fall and detection of the other is determined to be at or below a predetermined value, the noise processing means continues the timing operation by the rotational abnormal state judging means from a value of the lapse of time before the determination.

4. A protecting device according to claim 1, wherein the rotational abnormal state judging means comprises a main timer starting in response to the input signal and repeatedly delivering a voltage signal having a magnitude gradually varied from an initial value thereof with lapse of time, the rotational abnormal state judging means compares the gradually varied voltage signal delivered from the main timer with a reference value to thereby judge whether the rotation of the compressor is under the abnormal state, wherein the noise processing means sets a reset time constant of the main timer to an initial value larger than an expected time length of the noise, whereby the timing operation is substantially continued without the main timer being reset to the initial value in response to the input signal having a time length corresponding to the noise, wherein the starting processing means comprises a starting timer starting in connection with starting of the compressor, the starting processing means continuing the power supply to the electromagnetic clutch by the power supply control means for a period of time set by the starting timer in preference to the operation of the abnormal state processing means on the basis of the judgment by the rotational abnormal state judging means.

5. A protecting device according to claim 4, further comprising a detecting circuit receiving the signal from the rotation sensor and a temperature compensation circuit coping with variations in sensitivity of the detecting circuit due to changes in an ambient temperature.

6. A protecting device according to claim 4, which further comprises a detecting circuit receiving the signal from the rotation sensor and wherein a reverse bias voltage by means of a self induction voltage is applied to the detecting circuit when the electromagnetic clutch is open, so that a detection level of the detecting circuit is corrected.

7. A protecting device according to claim 4, further comprising state holding means for memorizing the abnormal state of the rotation of the compressor when the rotational abnormal state judging means judges that the rotation of the compressor is under the abnormal state, the state holding means maintaining deenergization of the electromagnetic clutch until an operation is executed to release the state holding means from a memorized state.

8. A protecting device according to claim 7, wherein the state holding means comprises a self holding type relay.

9. A protecting device according to claim 7, wherein the state holding means memorizes the abnormal state of the rotation of the compressor when the rotational abnormal state judging means judges at a predetermined number of times that the rotation of the compressor is under the abnormal state.

10. A protecting device according to claim 4, wherein the protecting device and the rotation sensor are integrated into a single assembly, which is attached to the compressor.

11. A protecting device according to claim 4, wherein the rotation sensor comprises a magnetoelectric conversion element for converting a magnetic flux applied thereto to a corresponding electric signal and two magnets producing a magnetic flux crossing a magnetic flux detecting surface of the magnetoelectric conversion element, and wherein the magnets are disposed so that the same one of poles of each magnet is opposed to the magnetic flux detecting surface of the magnetoelectric conversion element and so that the magnetic flux detecting surface of the magnetoelectric conversion element is located at such a position that a composite magnetic flux density of the magnets is offset approximately into zero.

12. A protecting device according to claim 11, wherein an amount of offset is set so that the composite magnetic flux density at a location of the magnetic flux detecting surface of the magnetoelectric conversion element is approximately zero when an external magnetic field is applied to the magnetoelectric conversion element.

13. A protecting device according to claim 1, wherein the protecting device and the rotation sensor are integrated into a single assembly, which is attached to the compressor.

14. A protecting device according to claim 1, further comprising state holding means for memorizing the abnormal state of the rotation of the compressor when the rotational abnormal state judging means judges that the rotation of the compressor is under the abnormal state, the state holding means maintaining deenergization of the electromagnetic clutch until an operation is executed to release the state holding means from a memorized state.

15. A protecting device according to claim 14, wherein the state holding means comprises a self holding type relay.

16. A protecting device according to claim 14, wherein the state holding means memorizes the abnormal state of the rotation of the compressor when the rotational abnormal state judging means judges at a predetermined number of times that the rotation of the compressor is under the abnormal state.

17. A protecting device according to claim 1, wherein the rotation sensor comprises a magnetoelectric conversion element for converting a magnetic flux applied thereto to a corresponding electric signal and two magnets producing a magnetic flux crossing a magnetic flux detecting surface of the magnetoelectric conversion element, and wherein the magnets are disposed so that the same one of poles of each magnet is opposed to the magnetic flux detecting surface of the magnetoelectric conversion element and so that the magnetic flux detecting surface of the magnetoelectric conversion element is located at such a position that a composite magnetic flux density of the magnets is offset approximately into zero.

18. A protecting device according to claim 17, wherein an amount of offset is set so that the composite magnetic flux density at a location of the magnetic flux detecting surface of the magnetoelectric conversion element is approximately zero when an external magnetic field is applied to the magnetoelectric conversion element.

19. A protecting device for a car air conditioner which receives, from a rotation sensor mounted on a compressor of the car air conditioner, a rotation signal, as an input signal, having a time-dependent component varied according to a rotational speed of the compressor, thereby controlling an electromagnetic clutch provided between the compressor and an engine on the basis of the input signal so that the electromagnetic clutch is energized and deenergized, the protecting device comprising:

rotational abnormal state judging means repeatedly timing a period of the time-dependent component of the input signal for judging whether rotation of the compressor is under an abnormal state, on the basis of a relation between the timed period and a reference value;

noise processing means for substantially continuing a timing operation by the rotational abnormal state judging means without returning the timing operation to an initial state when the time-dependent component of the input signal is at or below a predetermined value;

power supply control means for controlling electric power supply to the electromagnetic clutch;

abnormal state processing means for cutting off the power supply to the electromagnetic clutch by the power supply control means when the rotational abnormal state judging means judges, during the power supply to the electromagnetic clutch, that the rotation of the compressor is under the abnormal state; and starting processing means for continuing the power supply to the electromagnetic clutch by the power supply control means in preference to an operation of the abnormal state processing means on the basis of a judgment by the rotational abnormal state judging means until the rotation of the compressor is stabilized during starting thereof;

wherein each of the rotational abnormal state judging means, the noise processing means, the power supply control means, the abnormal state processing means, and the starting processing means comprises components each having a heat-resisting temperature higher than a temperature suffered at a mounting location thereof; and wherein the protecting device is disposed on or in the vicinity of a surface of the compressor of the car air conditioner.

* * * * *